United States Patent [19]

MacDonell et al.

[11] 4,395,178

[45] Jul. 26, 1983

[54] TRANSFER SYSTEM FOR USE BETWEEN PLATFORMS HAVING RELATIVE MOTION BETWEEN ONE ANOTHER

[75] Inventors: Wayne O. MacDonell, San Francisco, Calif.; Donald L. Graves, Federal Way; Thomas Timar, Seattle, both of Wash.

[73] Assignee: The Boeing Company, Seattle, Wash.

[21] Appl. No.: 214,257

[22] Filed: Dec. 8, 1980

[51] Int. Cl.[3] .............................................. B65G 67/58

[52] U.S. Cl. .................................... 414/138; 114/259; 114/366; 212/146; 254/277; 254/900; 414/786

[58] Field of Search ............... 414/137, 138, 139, 786; 212/190, 191, 146; 254/274, 275, 277, 361, 900; 114/259, 365, 366, 377, 378

[56] References Cited

U.S. PATENT DOCUMENTS

| | | | |
|---|---|---|---|
| 2,813,719 | 11/1957 | Hopper | 254/277 X |
| 2,998,148 | 8/1961 | Himel | 414/139 |
| 3,662,991 | 5/1972 | Lakiza et al. | 414/137 |
| 4,003,472 | 1/1977 | Reynolds | 414/139 X |
| 4,025,055 | 5/1977 | Strolenberg | 254/900 X |
| 4,166,545 | 9/1979 | Martinussen et al. | 414/138 X |
| 4,180,362 | 12/1979 | Stair | 414/139 |
| 4,236,695 | 12/1980 | Morrison | 254/277 |
| 4,324,385 | 4/1982 | Cojean et al. | 414/139 X |

FOREIGN PATENT DOCUMENTS

| | | | |
|---|---|---|---|
| 660889 | 5/1979 | U.S.S.R. | 414/138 |
| 747769 | 7/1980 | U.S.S.R. | 414/138 |

*Primary Examiner*—Leslie J. Paperner
*Attorney, Agent, or Firm*—Hughes, Barnard & Cassidy

[57] ABSTRACT

A carrier adapted to move between a movable vessel, such as a boat, and a stationary platform. The carrier has an extendable and retractable intermediate uphaul line adapted to be connected to a crane on the platform. It also has a downhaul line connected between the carrier and the vessel. When the carrier is being lifted from the vessel, the downhaul line is payed out at a controlled rate with the uphaul line extending and retracting to keep the carrier out of contact with the vessel which may be rising or falling due to wave action of the water. At a predetermined elevation, the tension in the downhaul line is decreased so that the uphaul line retracts to move the carrier out of the area of possible contact with the vessel. The reverse operation is followed to move the carrier from the platform to the vessel.

49 Claims, 28 Drawing Figures

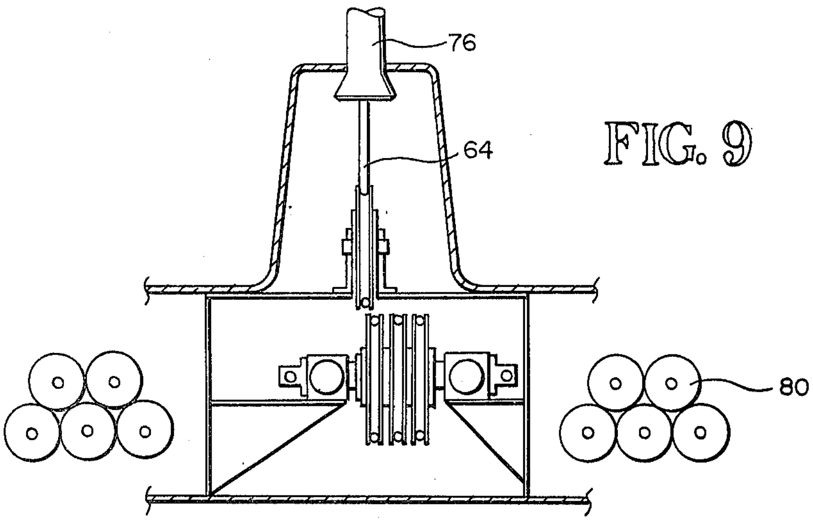
FIG. 9
FIG. 10
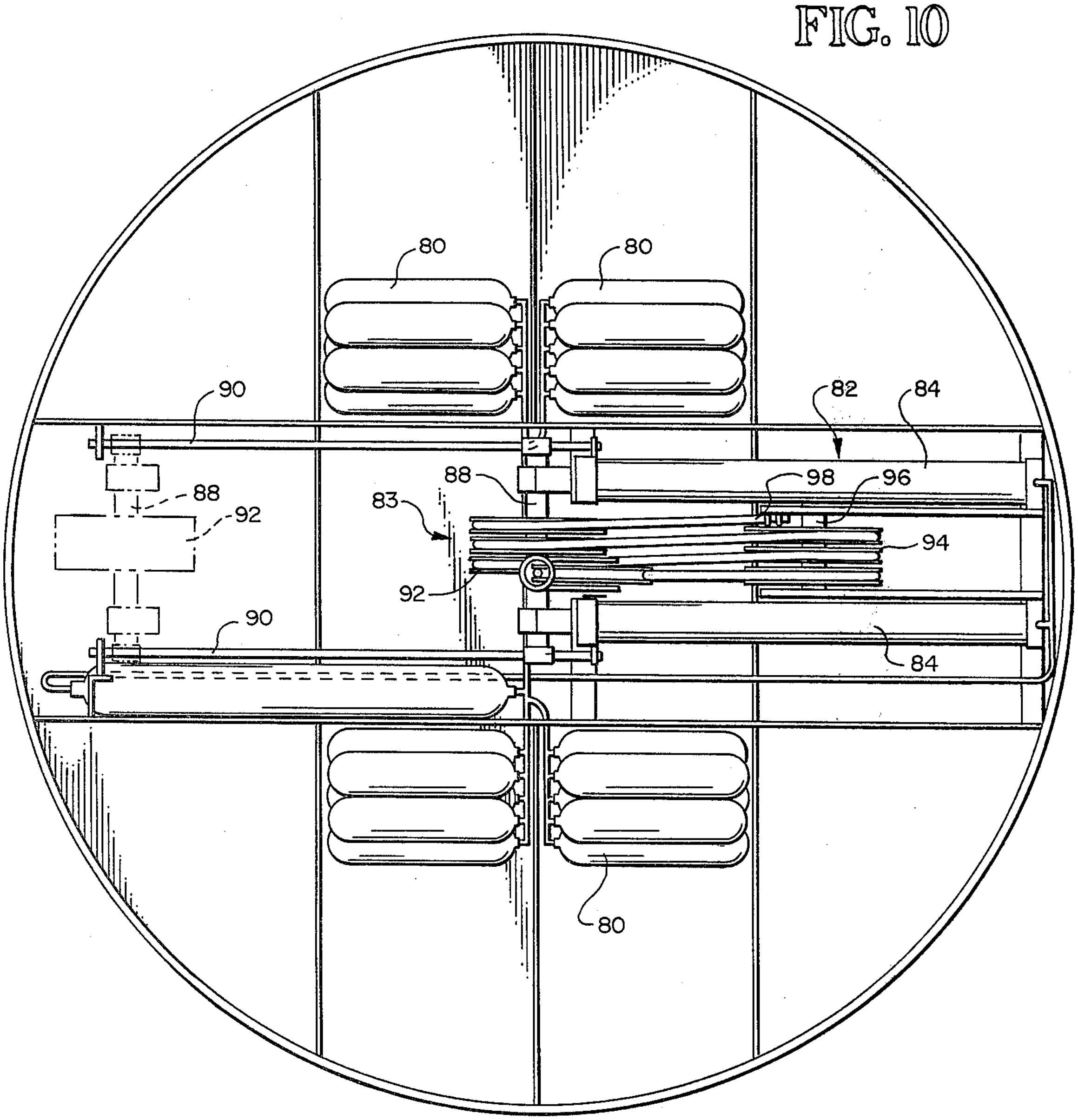

TRANSFER SYSTEM FOR USE BETWEEN PLATFORMS HAVING RELATIVE MOTION BETWEEN ONE ANOTHER

DESCRIPTION

Technical Field

The present invention relates to a transfer system to move personel or cargo between two relatively mouting platforms, and more particularly to such a system adapted to effect transfer between a water travelling vessel and an off-shore platform.

Background Art

The growth of off-shore oil industry has caused a great increase in people working and living off-shore. Early off-shore platform development has been close to shore, where there is relatively calm water, often with waves of two meters or less. However, with platforms now being placed in waters where the seas are rougher, it is more difficult to safely transfer personel and/or cargo between the off-shore platform and a water travelling vessel. In making a transfer from the vessel to the platform, there is a problem that the vessel may be carried upwardly by a rather large wave to impact the personel or cargo shortly after lift-off from the vessel. This same difficulty exists in effecting a transfer from the platform onto the vessel.

A search of the patent literature discloses a number of systems which propose solutions to this problem. For example, U.S. Pat. No. 4,180,362 shows a system where there is an uphaul winch mounted to a platform, such as an off-shore platform, and a downhaul winch mounted to the boat or other water travelling vessel. The downhaul winch has two tension levels. A higher tension level on the downhaul winch is employed when the cargo or personnel are closer to the boat, and the uphaul cable is either reeled in or payed out, depending upon whether the vessel is rising or falling on a wave. When the cargo or personnel are further above the boat so that there is no danger of impact by the vessel moving upwardly on a large wave, the downhaul winch is operated at a lower tension level, with cable from the lower winch being reeled in or payed out to keep the downhaul line taut.

U.S. Pat. No. 3,398,934, Lancashire et al, describes a system where cargo is transferred from a deck of a boat to an overhead helicopter. There is an uphaul winch mounted to the helicopter and this provides a constant tension on the uphaul cable. The downhaul winch operates at a constant rate.

British patent specification number 200,6151A discloses a lifting device which is suspended from a boom, and this lifting device in turn has an uphaul cable which is connected to a cargo load. The uphaul cable exerts a tension force less than the weight of the load so that it reels in and pays out to compensate for heaving as the load remains on the deck of the vessel. At a certain point, a braking device is activated to lock the uphaul cable in place. Thereafter the main cable attached to the boom raises the lifting device along with the load free of the vessel.

U.S. Pat. No. 4,025,055, Strolenberg, discloses a transfer system where there is a crane on the platform having an uphaul cable with a low tension operating mode and a high tension operating mode. There is a locking device, specifically a ratchet and pawl, which is activated to lift the load from the vessel at the crest of the upward motion of the vessel.

U.S. Pat. No. 3,662,991, Lakiza et al, shows a transfer system where a line is attached to the ship and also to the crane which moves the cargo to and from the ship. The line is retracted or extended as the ship rises and falls, and this retraction and extension of the line is used to control the action of the crane is moving the cargo when it is close to the ship. The following patents disclose somewhat similar systems, these being:

| | |
|---|---|
| U.S. Pat. No. 3,753,552 | Barron et al |
| U.S. Pat. No. 3,189,195 | Fox, Jr., et al |
| U.S. Pat. No. 3,675,900 | Barron et al |
| U.S. Pat. No. 3,648,858 | Barron et al |
| U.S. Pat. No. 3,591,022 | Polyakov et al. |

U.S. Pat. No. 2,874,855 Discloses a guide line which is stretched between the ship and the platform. A cargo carrier follows the guideline as it is raised or lowered relative to the vessel.

U.S. Pat. No. 3,217,660, Shillinger, Jr., describes a system to effect transfer between two ships. Lines are stretched horizontally between the two ships and means are provided for maintaining proper tension on the lines.

DISCLOSURE OF THE INVENTION

The overall transfer system of the present invention comprises a first platform and a second platform that are moveable relative to the first platform. There is first uphaul means operatively connected to the first platform.

A carrier is adapted to be moved between the first and second platform. This carrier comprises a carrier housing and extendable and retractable intermediate uphaul means adapted to be connected between the carrier housing and the first uphaul means. The intermediate uphaul means include actuating means to raise and lower the carrier housing relative to the first uphaul means by retracting and extending the intermediate uphaul means.

There is also downhaul means operatively connected between the carrier and the second platform and adapted to pull the carrier to said second platform.

The actuating means exerts a tension force through the intermediate uphaul means greater than weight of the carrier. Also, the downhaul means has a downhaul operating mode where it exerts on the carrier a downhaul force greater than a value which is equal to the tension force less the weight of the carrier.

In the preferred form, the actuating means comprises a resilient actuating mechanism comprising an actuating member which is yieldingly urged toward movement in a direction to retract the intermediate uphaul means and yieldingly resist movement in a direction to extend the intermediate uphaul means. Also, desirably the actuating means comprises velocity control means to limit velocity of the actuating member in a direction to retract the intermediate uphaul means.

In the specific form shown herein, the velocity control means is arranged to have a higher velocity limiting mode and a lower velocity limiting mode. The higher velocity limiting mode is operative during a first portion of travel of the actuating member to retract the intermediate uphaul means, and the second lower limiting mode is operative during a second portion of travel of the actuating member completing retraction of the intermediate uphaul means. As shown herein, the velocity control means comprises hydraulic means having orifice means with a higher flow rate for the first portion of travel of the actuating member, and a lower flow rate for the second portion of travel of the actuating member.

Preferably, the velocity control means comprises high flow hydraulic return means which permits hydraulic flow in a reverse direction so as to permit movement of the actuating member at a higher rate in a direction to extend the intermediate uphaul means.

The hydraulic system for the velocity control means has a first higher flow rate orifice and a second lower flow rate orifice. This hydraulic system is arranged so that during the first portion of travel of the actuating member to retract the intermediate uphaul means, movement of the actuating member moves hydraulic fluid through the first orifice to enable said actuating member to move at a higher velocity. During a second portion of travel of the actuating member to retract the intermediate uphaul means further to a fully retracted position, the second orifice means limits hydraulic flow to cause the actuating member to move at a lower velocity. As shown herein, the actuating member is operatively connected to a chamber containing the hydraulic fluid, and movement of the actuating member to retract the intermediate uphaul means reduces volume of the chamber to move the hydraulic fluid therefrom.

In the preferred form, the actuating means comprises a cylinder and piston assembly which comprises piston means and cylinder means. The intermediate uphaul means comprises an intermediate uphaul line operatively connected to the cylinder and piston assembly in a manner that extension of the assembly retracts the line and retraction of the assembly permits extension of the line. Preferably, the cylinder and piston assembly is actuated by a compressible gas so as to be yieldingly urged toward movement in a direction to retract the intermediate uphaul line and yieldingly resist movement in a direction to extend the intermediate uphaul line.

In the preferred form, the cylinder and piston assembly is connected to a sheave assembly comprising first sheave means connected to the piston means and second sheave means connected to the cylinder means. The intermediate uphaul line is connected between the first and second sheave means. Desirably, the actuating means, including the cylinder and piston assembly and the sheave means, is located in a lower part of said housing so as to provide a relatively low center of gravity for said carrier.

Desirably the downhaul means comprises a downhaul cable, and the downhaul means has three operating modes, namely:

a. a velocity controlled retracting mode where said downhaul cable is retracted at a controlled velocity, b. a velocity controlled extending mode where said downhaul cable is extended at a controlled velocity, c. a low tension mode where the downhaul cable is extended or retracted selectively to alleviate slack in the cable where there is oscillating movement between the carrier and the platform.

Desirably the downhaul means comprises a hydraulic power system with a hydraulic pump and a hydraulic motor. In the retracting mode the pump drives the motor. In the extending mode the hydraulic motor is driven by tension on the downhaul cable to move hydraulic fluid from the motor. The pump is controlled to limit flow of hydraulic fluid to the motor. In the low tension mode, the pump delivers hydraulic fluid in a direction to retract the downhaul cable at a relatively low pressure, and the motor is able to move in a direction opposite to a direction of which the pump intends to drive the motor. Desirably, the system has a low pressure bypass means which can be selectively brought into operation for the low tension mode. In the specific form shown herein, for the second controlled velocity extending mode, the flow from the pump is used to control the flow from the motor.

When the system of the present invention is used specifically to transfer a carrier from a water floating vessel to a platform located adjacent water, the vessel functions as the second platform. The system is then adapted to operate in wave conditions where the waves are within a predetermined maximum wave height. To accomplish this, the intermediae uphaul means has a fully retracted position and a fully extended position spaced from the fully retracted position by an extension distance greater than the maximum wave height. With the intermediate uphaul means comprising an uphaul line, this line can be extended to a length greater than the maximum wave height.

In the method of the present invention, the carrier is initially secured to the second platform, and the first uphaul means is attached to the upper end of the intermediate uphaul means. Then the first uphaul means is raised so as to extend the intermediate uphaul means a predetermined distance, while the carrier is secured to the second platform.

The carrier is released from the second platform and the actuating means retracts the intermediate uphaul means to lift the carrier from the second platform toward the first uphaul means. Then the first uphaul means is operated to move the carrier to the first platform.

In the preferred form, the method is practiced by providing the downhaul means between the second platform and the carrier. The downhaul means is extended as the carrier is released from the second platform, and the downhaul means remains connected between the second platform and the carrier.

Desirably, the downhaul means is initially extended at a controlled velocity so as to maintain a proper spacing distance relationship between the carrier and the second platform, with the intermediate uphaul means extending or retracting to compensate for relative motion between the first and second platforms. After the uphaul means is raised further, the downhaul means is operated at a low tension mode to permit the intermediate uphaul means to retract and move the carrier upwardly toward the first uphaul means.

With the system of the present invention being utilized as a means to effect transfer between a water floating vessel and a platform at the water, the first uphaul means is raised to a height such that the intermediate uphaul means is extended a distance greater than the maximum wave height when the vessel is at a bottom of a wave. Then the carrier is released from the vessel so that the intermediate uphaul means can lift it to a height above the maximum wave height. In lowering the carrier back to the vessel, the uphaul means on the platform lowers the carrier to a position above the maximum wave height, while the downhaul means is in the low tension mode. Then, the downhaul means is operated at its controlled velocity retracting mode to move the carrier downwardly onto the vessel, with the intermediate uphaul line extending or retracting to compensate for relative motion between the vessel and the platform.

To accomplish proper docking of the carrier, as another facet of the present invention, the first platform is provided with a docking station having a receiving structure. This receiving structure has a laterally open through slot to receive the downhaul cable that is connected to the carrier. Thus, in the method of the present invention, as the carrier is moved onto the receiving structure, the downhaul cable is permitted to slip into the slot. In removing the carrier from the docking station, the cable can easily slip out of the slot.

Other facets of the invention will become apparent from the following detailed description.

BRIEF DESCRIPTION OF THE DRAWINGS

FIG. 9 is a sectional view taken at 9—9 of FIG. 8;

FIG. 10 is a sectional view taken from a location immediately below the deck of the carrier and looking downwardly on the lower portion of the carrier;

BEST MODE FOR CARRYING OUT THE INVENTION

Figure 1:
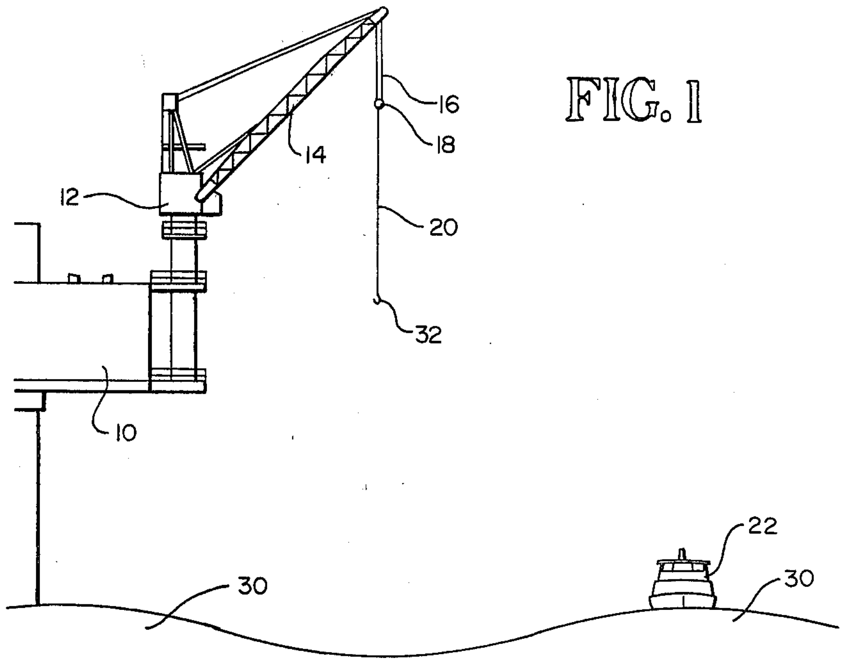
FIG. 1 is an environmental view showing a vessel approaching an off-shore platform for transfer of a personnel carrier onto the platform.

As illustrated in FIGS. 1 thru 4, there is an off-shore platform 10 on which is mounted a crane 12. This crane 12 comprises a boom 14 having a main uphaul cable 16 at the lower end of which is a main block 18. Attached to the main block 18 is a pendant line 20. This crane is or may be of conventional design, and as will be disclosed more fully in the following description, one of the advantageous features of the system of the present invention is that a conventional crane can be utilized, such as one of those which already exist in many offshore platforms.

The system of the present invention was particularly designed for use in connection with a hydrofoil vessel, such as the Jetfoil (a trademark of the Boeing Company) hydrofoil. Such a vessel is illustrated at 22 in FIGS. 1 thru 4, where there also is shown a transfer carrier 24 which in FIG. 2 is shown secured to a landing pad 26 on the deck 28 of the vessel.

Figure 2:
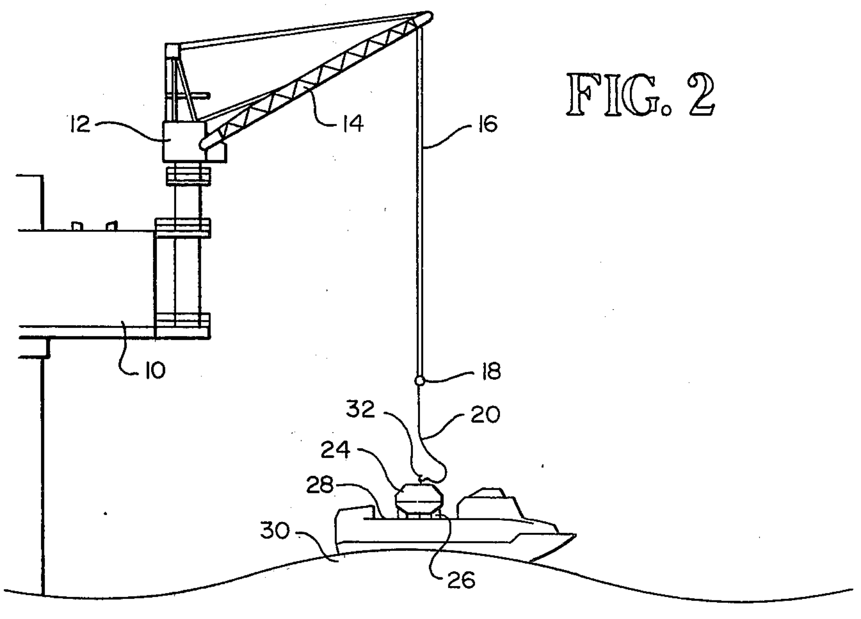
FIG. 2 is a view similar to FIG. 1, showing the vessel in place and a pendant line engaging the carrier which is on the deck of the vessel.

FIGS. 1 thru 4 are intended to illustrate generally the manner in which the carrier 24 is moved from the vessel 22 onto the platform 10, and then returned to the vessel 22. In FIG. 1, the vessel 22 is shown approaching the platform 10 in a sea where there are waves, indicated at 30. Next, FIG. 2 shows the vessel 22 positioned beneath the crane 12. The main uphaul cable 16 has been lowered, and the hook 32 at the lower end of the pendant line 20 has been attached at the top side of the carrier 24.

Figure 3:
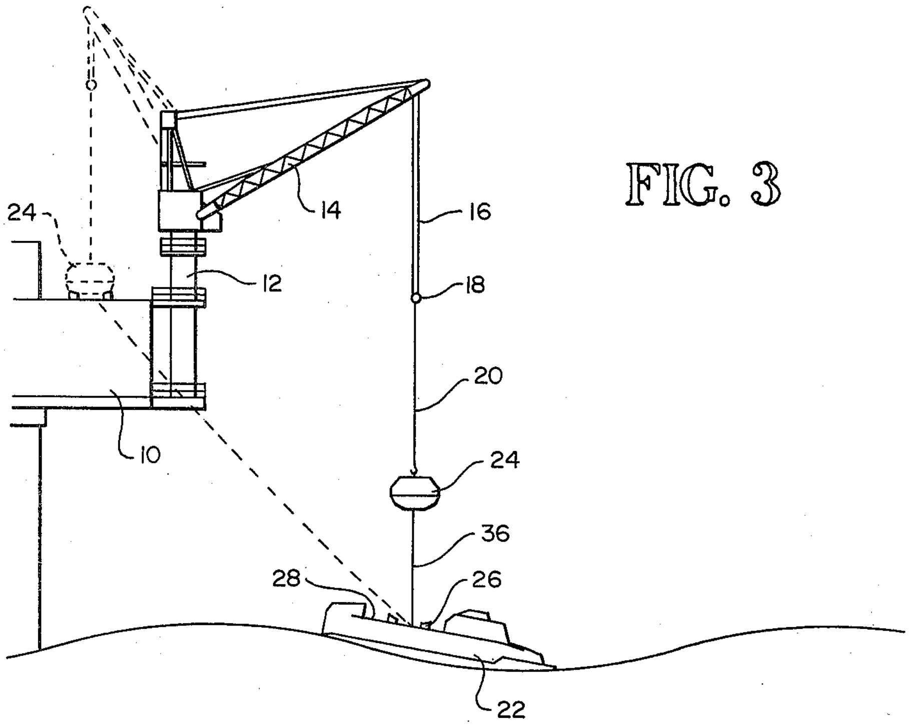
FIG. 3 is a view similar to FIGS. 1 and 2 showing in full lines the carrier raised from the vessel and in broken lines placed on the platform.
Figure 4:
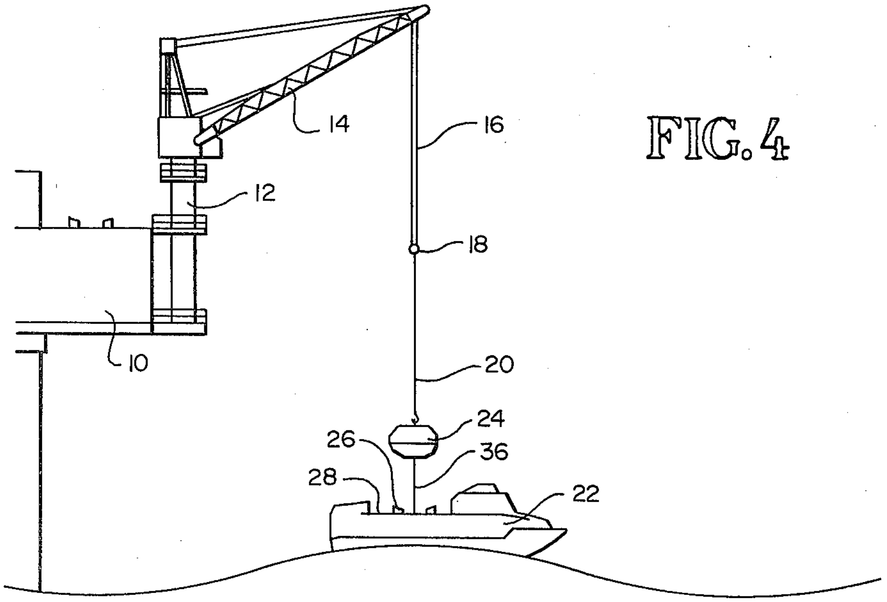
FIG. 4 is a view similar to the previous three views, showing the carrier positioned above the vessel in preparation for placing the carrier on the vessel.

In FIG. 3, the carrier 24 is next shown in full lines where it has been lifted a moderate distance above the vessel 22. The carrier 24 is then raised to a height moderately above the platform and swung over to be placed on the platform 10 (this being shown in broken lines in FIG. 3.) As the carrier 24 is lifted upwardly from the full line position of FIG. 3, a downhaul line 36, attached to an eye 34 on the bottom of the carrier 24, is payed out from the vessel 22 in a manner that the downhaul line 36 remains reasonably taut.

When it is desired to return the carrier 24 to the vessel 22, the crane 12 picks the carrier 24 off the dock, lifts it to a location above the vessel 22 and then lowers the carrier 24. The downhaul line 36 then pulls the carrier 24 onto the landing pad 26 of the vessel 22.

As indicated previously herein, when the vessel 22 is heaving because of wave action, there are problems in preventing a collision between the carrier 24 and the vessel 22 when the carrier 24 is a short distance above the vessel 22 in either the uphaul mode or downhaul mode. In the following description, first the apparatus of the present invention (by which this problem is effectively solved) will be described, and this is followed by a description of the method of the present invention.

Figure 5:
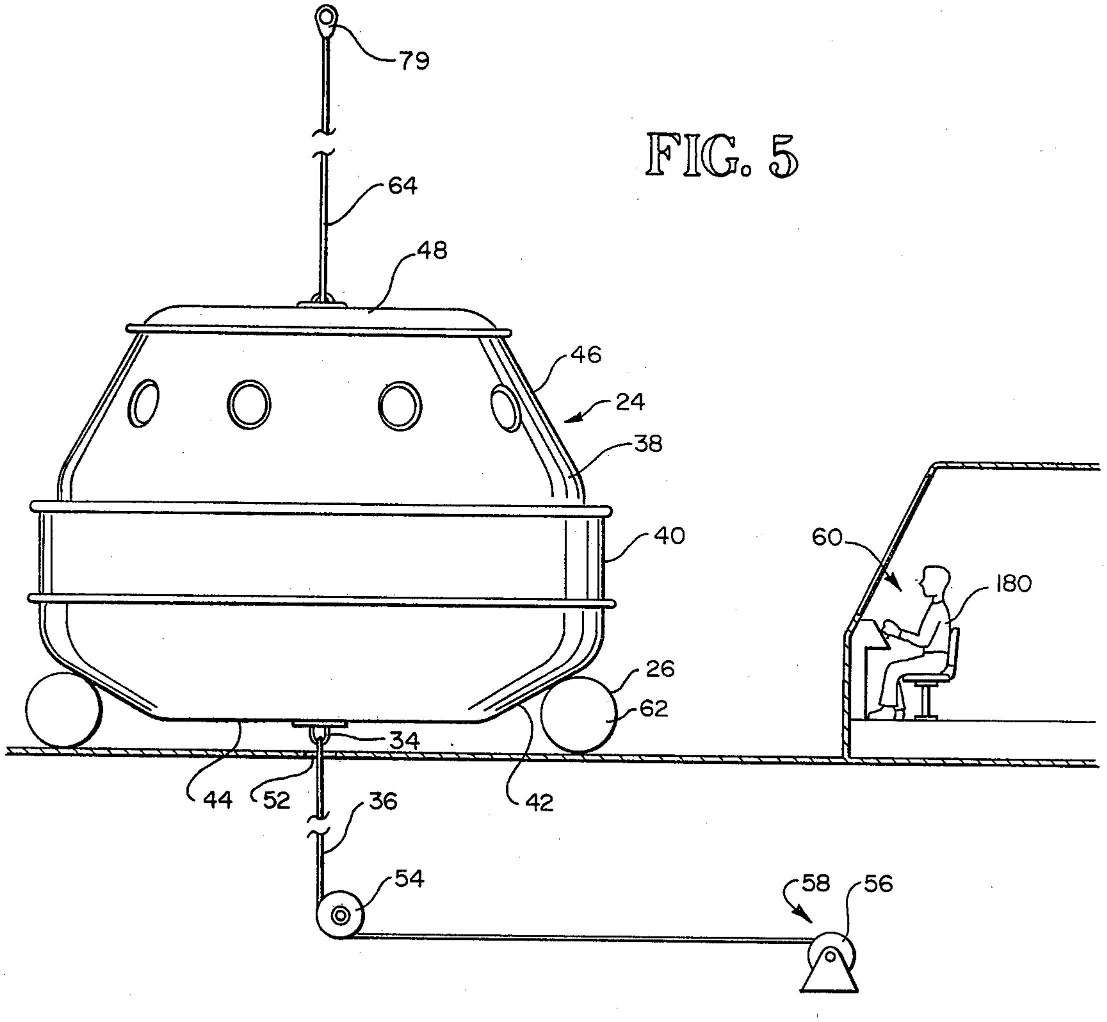
FIG. 5 is a side elevational view, showing the deck of the vessel in section, and showing the carrier secured to the deck of the vessel.

The carrier 24 is critical in the present invention, and in FIG. 5, the carrier 24 is shown secured to the landing pad 26 on the deck 28 of the vessel 22. The carrier 24 comprises a carrier housing 38 which is generally symmetrical about a vertical center axis of the housing 38, with the housing 38 having a generally circular configuration of a surface of revolution. The lower side surface 40 of the housing 38 has a generally cylindrical configuration. The bottom surface of the housing 38 has two portions, namely a peripheral portion 42 which slopes downwardly and inwardly in a configuration of a truncated cone, and a lowermost middle surface portion 44 that is horizontally disposed and substantially flat. There is an upper side surface portion 46 that slopes upwardly and inwardly, also as a truncated cone, and a top surface 48 which is substantially flat.

The eye 34 is attached to the center point of the lowermost surface portion 44, and the end of the downhaul line 36 is attached to this eye 34. The downhaul line 36 extends through an opening 52 in the deck 28, and as shown herein, reaches around an idler roller or sheave 54 and is wound on a reel 56 of a downhaul winch, generally designated 58.

Positioned a short distance from the landing pad 26 is an operating station 60, from which is winch 58 is controlled. The landing pad 26 should provide some cushioning for the carrier 24, and as shown herein it comprises a plurality of pneumatic cushions 62 arranged in a generally circular configuration to engage the lower peripheral surface portion 42 of the carrier housing 38.

Mounted within the carrier 24 is an intermediate uphaul line 64. For purposes of illustration in FIG. 5 the uphaul line 64 is shown extended from the top surface 48 of the carrier housing 38, but it is to be understood that in this situation, it would normally be fully retracted. The function of this intermediate uphaul line 64 is quite significant in the present invention and will be described more particularly later herein.

Figure 6:
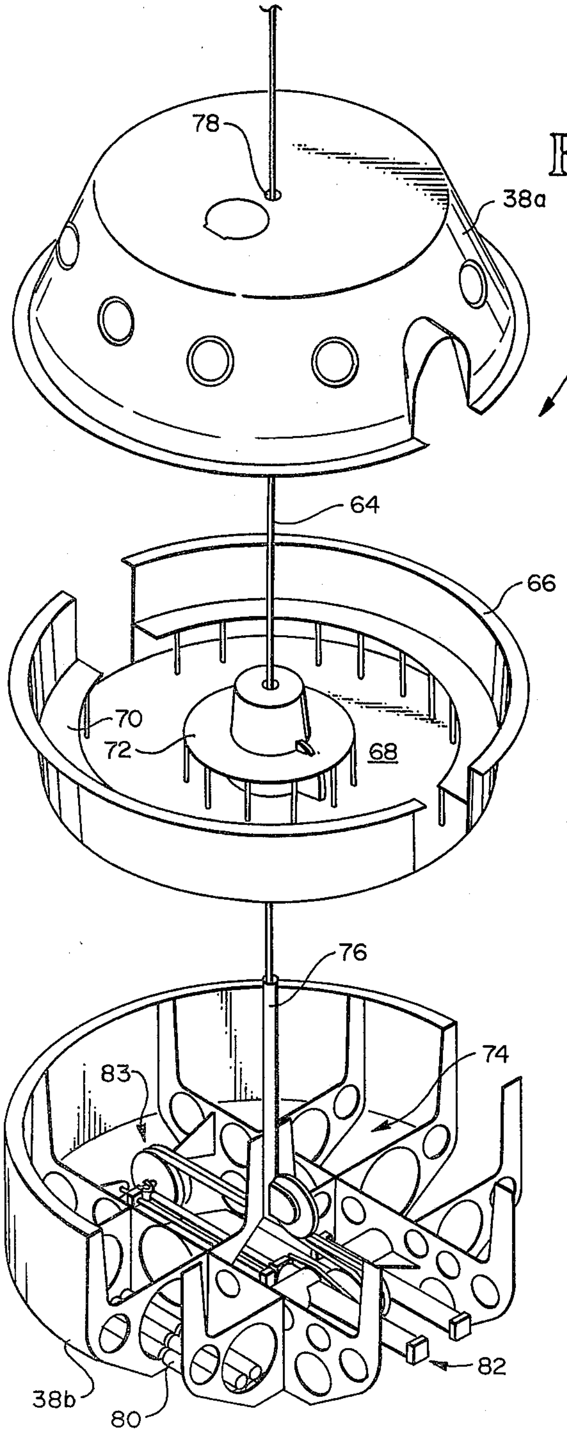
FIG. 6 is an exploded view, showing three main components which are assembled to form the structure of the carrier.
Figure 7:
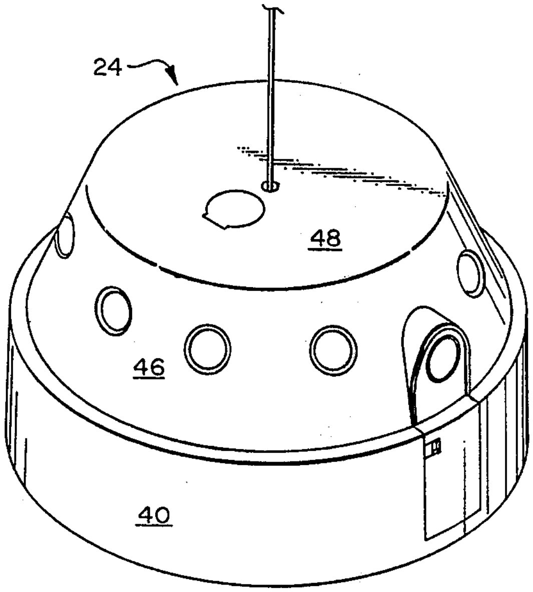
FIG. 7 is an isometric view of the carrier.

The carrier 24 as described herein is particularly adapted for personnel transfer, and is constructed as a transfer cab adapted to carry as many as thirty people at one time. In the exploded view of FIG. 6, it can be seen that the carrier housing 38 is made up of upper and lower sections **38*a* and 38*b*, within which is a personnel section 66. This section 66 comprises a lower floor 68, and outer and inner circular benches 70 and 72. Positioned in the lower housing section 38*b* just below the floor 68 is an actuating mechanism 74 for the intermediate uphaul line 64. The line 64 extends from the actuating mechanism 74 upwardly through a central tube 76 and then through a top opening 78 formed centrally in the upper housing section 38*a* to connect to an eye 79. As will be described more fully later herein, the actuating mechanism 74 functions to retract or permit extension of the intermediate line 64**.

Figure 8:
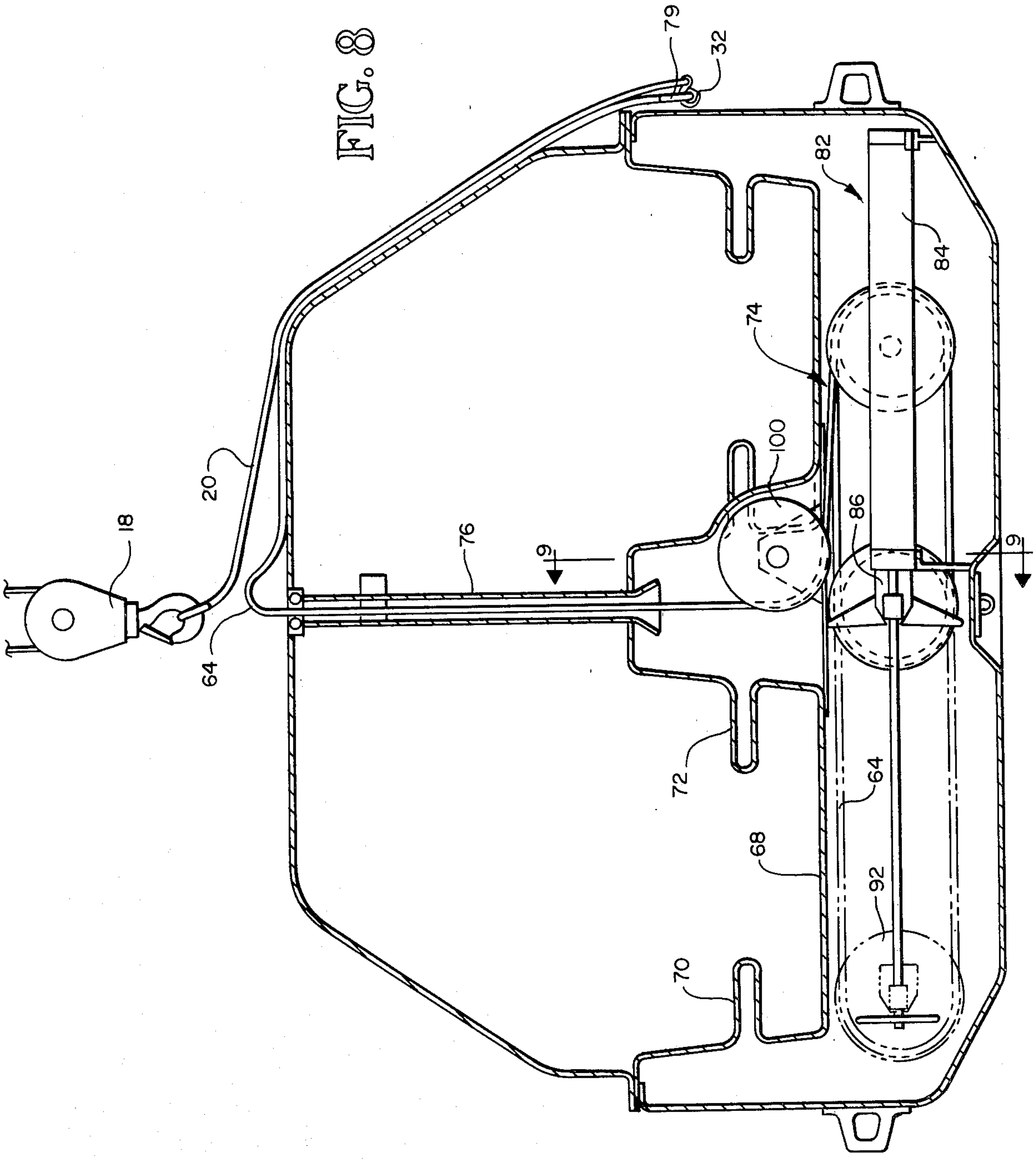
FIG. 8 is a sectional view taken through the vertical center line of the carrier.

With reference to FIGS. 8 thru 10, the actuating mechanism 74 comprises a plurality of pressure tanks 80, a piston and cylinder actuating member 82, and a sheave assembly 83. The pressure tanks provide pressurized air to power the actuating member 82 to urge the member 82 toward its extended position. The actuating member 82 in turn functions to extend the sheave assembly 83 to retract the intermediate line 64; also as will be described later herein, the actuating member 82 can be caused to be retracted to permit extension of the intermediate line 64. In FIGS. 8 and 10, the actuating member 82 is shown in full lines retracted, so that the sheave assembly 83 is in turn retracted, in which condition the intermediate line 64 is extended. The actuating member 82 is shown in FIGS. 8 and 10 in broken lines in its extended position, in which condition the intermediate line 64 would in turn be retracted.

The piston and cylinder actuating member 82 and also the sheave assembly 83 are aligned along a horizontal axis extending through the vertical center axis of the carrier housing 38. As shown herein, the actuating member 82 comprises a pair of laterally spaced cylinders 84 fixedly secured to stationary structure on one side of the lower portion of the housing 38. There are two pistons 86, one for each cylinder 84, and the outer ends of the two pistons 86 are connected by a cross member 88. The front side portion of the two pistons 86 are mounted to two guide rails 90 to properly align the two pistons 86 as they move forwardly to the fully extended position shown in broken lines in FIGS. 8 and 10.

The sheave assembly 83 in the particular configuration shown herein, comprises three forward sheave members 92 rotatably mounted on the cross-member 88 so as to be moveable with the pistons 86. The sheave assembly 83 also comprises three rear sheave members 94 which are mounted to a fixed cross-member 96 at a location between the two cylinders 84. The intermediate uphaul line 64 has its anchor end secured at 98 to stationary structure, and the line 64 extends back and forth between the sheave members 92 and 94, thence around a guide sheave or roller 100 to extend thence upwardly through the aforementioned guide tube 76. Thus, with the line 64 reaching in six generally parallel lengths between the sheave members 92 and 94, a one foot extension of the two pistons 86 causes a six foot retraction of the intermediate uphaul line 64.

It will be noted that the actuating member 82 and sheave assembly 83 are centrally positioned at a lower location. The tanks 80 are positioned on opposite sides of the actuating member 82, also at a lower position. Thus, the tanks 80, actuating member 82 and sheave assembly 84 are positioned to cause the center of gravity of the carrier 24 to be located relatively low. Thus, if the carrier 24 is deliberately or through some mishap placed on the water, the carrier 24 will tend to float in an upright position.

Figure 17:
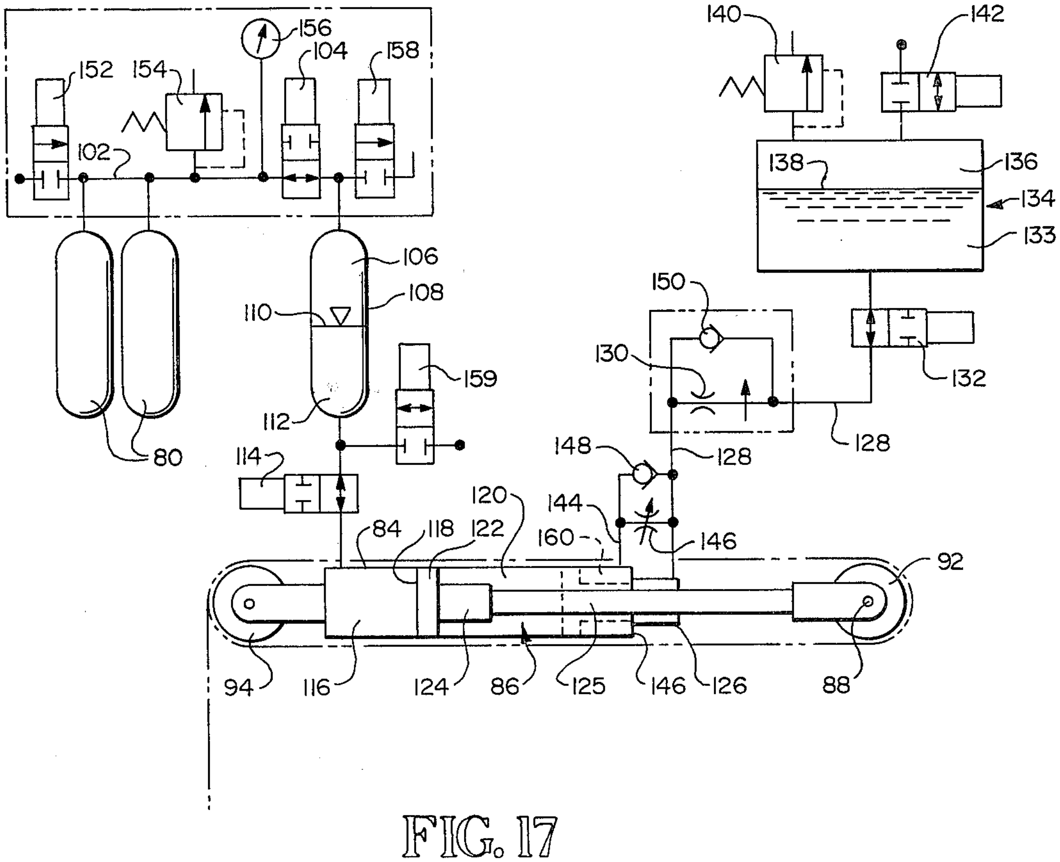
FIG. 17 is a schematic view of the hyraulic control system for the actuating mechanism of the intermediate uphaul cable.

Reference is now made to FIG. 17, which shows the hydraulic control system for the actuating mechanism 74. The several pressure tanks 80 connect to a pressure line 102 that in turn connects thru a shut-off valve 104 to a pressure chamber 106 of an accumulator 108. The accumulator 108 is separated by a bladder 110 into the aforementioned gas pressure chamber 106 and a hydraulic pressure chamber 112. The pressurized gas in the chamber 106 acts thru the bladder 110 against the hydraulic fluid in the chamber 112 to supply hydraulic fluid at the proper pressure.

The hydraulic chamber 112 connects thru a second shut-off valve 114 to the two expansion chambers 116 that are defined by the two cylinders 80 and the two working faces 118 of the two pistons 86. (For convenience only one piston 84 is shown.) With the valve 114 in its open position (as shown in FIG. 17), the hydraulic fluid in the chamber 112 pressurizes the two chambers 116 to tend to extend the two pistons 86 forwardly.

Each piston 86 also defines with its related cylinder 84 a forward chamber 120 which in the present invention functions as a velocity control chamber for its related piston 86. Each piston 86 comprises a head portion 122 that separates the two chambers 116 and 120, and also a stepped portion 124 that is connected directly to and forward of the head portion 122 and has a moderately small diameter than the head portion 122. The piston 86 further comprises the piston rod 125 that extends forwardly from the stepped portion 124 thru the front end of the cylinder 84 to connect to the moveable set of sheaves 92.

The front end of each cylinder 84 has a stepped configuration matching that of the piston head 122 and the piston stepped portion 124. Thus, the front end of the cylinder 84 is formed with a reduced diameter portion 126 that is adapted to engage the stepped portion 124 in a hydraulically sealed relationship. As will be disclosed more fully hereinafter, this reduced cylinder portion 126 cooperates with the piston head 122 and stepped piston portion 124 to control the velocity at which the piston 86 travels to its extended position. Specifically, thru the major portion of the travel of the piston 86 from its retracted position to its extended position, the piston 86 travels at a higher velocity. However, when it approaches its end limit of travel, the velocity of the piston is reduced. The significance of this, in terms of controlling the upward motion of the carrier 24, will become apparent from the description of the operation of the present invention which appears later herein.

Leading from the extreme forward end of the cylinder 84 (i.e. from the forward part of the reduced cylinder portion 126) is a hydraulic line 128 which connects thru a rate pressure responsive control valve 130 and thru a shut-off valve 132 to a hydraulic chamber 133 of a fluid reservoir 134. This reservoir 134 is provided with a low pressure air chamber 136 which acts against a separating bladder 138 with a relatively low pressure to exert only moderate pressure on the fluid in the chamber 133. The chamber 136 is provided with a pressure relief valve 140, and also with a recharge and vent valve 142.

Another line 144 connects to the cylinder 84 at a location just rearwardly of the stepped portion 146 that defines the rear end of the reduced diameter portion 126 of the cylinder 84. This line 144 connects thru a snubber orifice 146 to the line 128 at a location between the valve 130 and the connecting point of line 128 to the cylinder 84. This snubber orifice 146 is a variable orifice which can be adjusted to permit greater or less flow therethrough, depending upon the snubbing action required. A check valve 148 is connected in parallel with the snubber orifice 146, this valve 148 acting to prevent flow from the cylinder 84 through the line 144 but permitting free flow in the opposite direction. In like manner, there is another check valve 150 connected in parallel with the rate orifice 130. This valve 150 also permits no flow through the valve 150 in a direction from the cylinder to the reservoir 134, but permits flow in the opposite direction.

There are a number of other valves provided in the system. There is a recharge valve 152 which connects to the line 102 so that the pressure tanks 80 can be charged. A pressure relief valve 154 and a pressure gauge 156 also connect to the line 102. Finally, there are vent and pressure relief valves 158 and 159, one connected to the line 102 and the other connected to vavle 104 and the hydraulic chamber 112.

To describe the operation of the actuating mechanism 74, the tanks 80 are pressurized to a relatively high level, this in turn pressurizing the air or other gas in the chamber 106 to exert a relatively high pressure on the hydraulic fluid contained in the chamber 112. The valve 114 is normally open, and this fluid 112 in turn pressurizes the fluid in the chamber 116 to move the piston 84 in a forward direction. Since the fluid in the chamber 120, forward of the piston head 122 connects through the orifice 130 and valve 132 to a low pressure fluid source at 134, the piston 86 continues to move forwardly so as to extend the piston 86. However, the rate of travel of the piston 86 is limited by the flow rate permitted by the valve 130.

When the piston 86 has moved toward the end of its extension stroke, the stepped piston portion 124 begins to enter the forward reduced diameter portion 126 of the cylinder 84. (The piston head 122 and stepped portion 124 are shown in broken lines in that position. It can be seen that the piston head 122 and stepped portion 124 then close off a small annular chamber, indicated at 160, which chamber 160 communicates only with the line 144. The result is that further forward travel of the piston 86 is limited by the rate at which fluid can pass from the chamber 160 thru the snubber orifice 146. Since the snubber orifice 146 is normally set to permit flow at a rate lower than that of the valve 130, the rate of travel of the piston 86 at the end of its extension stroke is reduced.

When the piston 86 is fully extended, it will remain in that position until a sufficiently high force is exerted on the uphaul line 64 to pull the forward set of sheaves 92 rearwardly so as to tend to retract the piston 86. At such time as the force in the line 64 is sufficiently high to overcome the force exerted by the fluid in the chamber 116, the piston 86 will retract.

Figure 18:
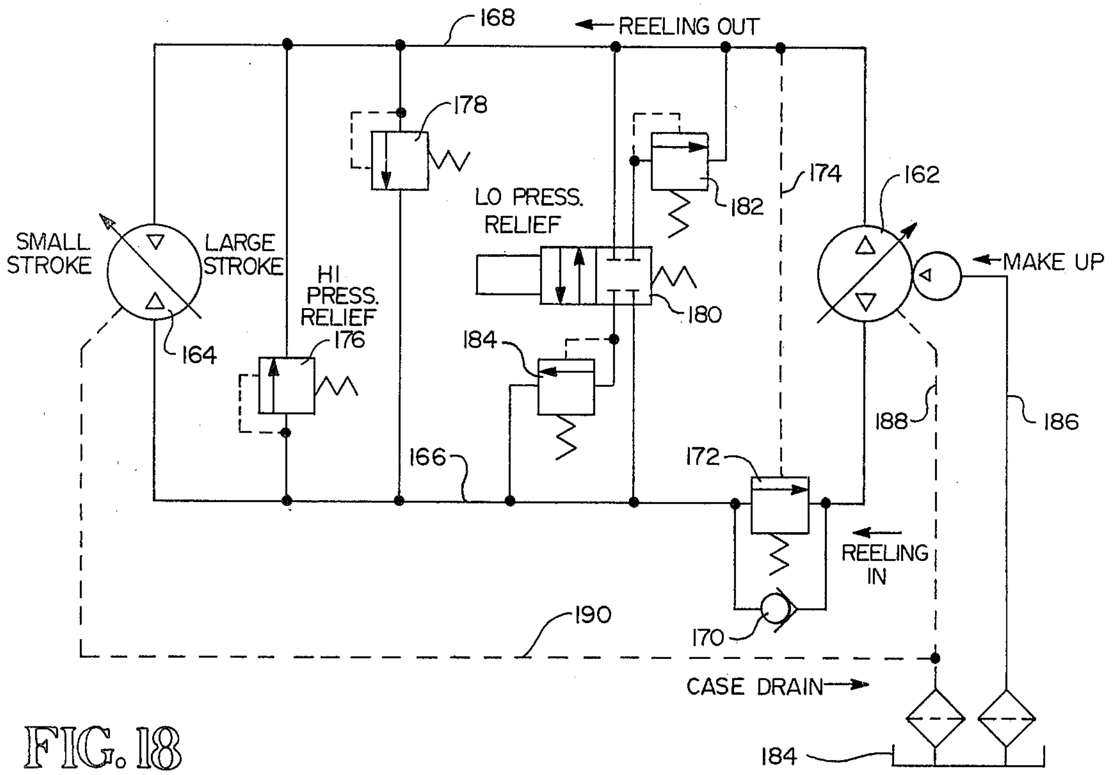
FIG. 18 is a schematic view of the hydraulic system for the downhaul winch.

Reference is made to FIG. 18, which is a schematic drawing of this hydraulic system for the downhaul winch 58. There is a variable flow reversible pump 162 and a variable stroke motor 164. The pump 162 and motor 164 are connected by a pair of hydraulic lines 166 and 168, the line 166 being designated a "reeling in" line and the line 168 being designated a "reeling out" line.

Connected into the line 166 are a check valve 170 and a pressure responsive valve 172, these being connected in parallel with one another. The check valve 170 is arranged so that it permits flow from the pump 162 and through the line 166 to the motor 164. The pressure responsive valve 172 permits flow from the motor 164 back to the pump 162. This valve 172 is responsive to pressure in the reeling out line 168 in a manner that an increase in pressure in the line 168 above a certain level opens the valve 172, and this functional relationship is illustrated by the broken line 174. A pair of pressure relief valves 176 and 178 are connected between the lines 166 and 168 in parallel with one another and with the motor 164. These valves 176 and 178 are set at a fairly high level and are provided primarily to prevent the downhaul winch 58 from exerting such a high force on the downhaul line 36 as to cause damage to the components of the system.

Also connected between the two lines 166 and 168 is a shut off valve 180. This valve 180 connects through a first pressure relief valve 182 to the line 168, and through a second pressure relief valve 184 to the line 166. These valves 182 and 184 are set to open in response to a relatively low pressure in the lines 166 and 168, respectively.

A hydraulic fluid reservoir is provided at 184, and a make up line 186 is connected to the pump 168. Drain lines 188 and 190 are provided from the pump 162 and motor 164, respectively.

To describe the operation of the hydraulic system of FIG. 18, there are three distinct active modes for the downhaul winch 58, namely:

(a) a velocity controlled downhaul mode,
(b) a velocity controlled uphaul mode,
(c) a high velocity low tension mode.

In the first mode, the low pressure relief valve 180 is closed, and the pump 162 is operated in a direction to direct fluid through the check valve 170 and the line 166 to the motor 164 to cause the motor 164 to turn in a direction to cause the reel 56 to reel in the downhaul line 36. The operator can control the velocity of the motor 164 simply by controlling the output of the pump 162.

To operate in the second mode, the direction of the pump 162 is reversed so that the pump delivers fluid through the line 168 to the motor 164. As long as the motor 164 rotates at a speed matching the output of the pump 162, there will be sufficiently high pressure in the line 168 to keep the valve 172 open so that the hydraulic fluid continues to circulate from the pump 162 through the motor 164 and back through the pump 162. However, when the motor 164 tends to overrun the pump 162, it reduces the pressure in the line 168 to move the valve 172 toward a closed position and slow the motor 164 down. This in turn permits the pump 162 to "catch up" with the motor 164 and restore pressure in the line 168 to move the valve 172 toward its open position.

Thus, it can be seen that from a control standpoint, in both the downhaul and uphaul modes, the operation is identical (i.e. the velocity at which the line 36 is either reeled in or reeled out is controlled by controlling the output from the pump 162). However, from a mechanical standpoint, the downhaul mode is a powered mode where the pump 162 positively drives the motor 164. On the other hand, the uphaul mode is essentially a braking mode where the pump 162 simply supplies fluid at a rate such that the control valve 172 is selectively oerated to control the speed of the motor 164. In the event there is excessive tension on the downhaul line 36, one or the other of the high pressure relief valves 176 and 178 will open to permit the motor 164 to rotate at a speed and direction to alleviate the excessive tension on the line 36.

In the third mode, the valve 180 is moved to the open position and the pump 162 is operated to pump fluid through the line 168 to the motor 164 at a relatively high rate. To achieve an adequately high speed for the motor 164, the motor 164 may be set so that it operates at a higher speed for a given amount of hydraulic fluid. Thus, the pump 162 is operating in a manner to tend to reel in the line 36 at a relatively high velocity. If there is tension on the line 36 above a predetermined relatively low value, this will be reacted into the motor to cause a rise in pressure in line 168 or 166. This will cause one or the other of the valves 182 or 184 to open and permit the motor 164 to rotate in a manner to bring the tension on the line 36 to the predetermined lower level, after which the valve 182 or 184 returns to its closed position.

Figure 16:
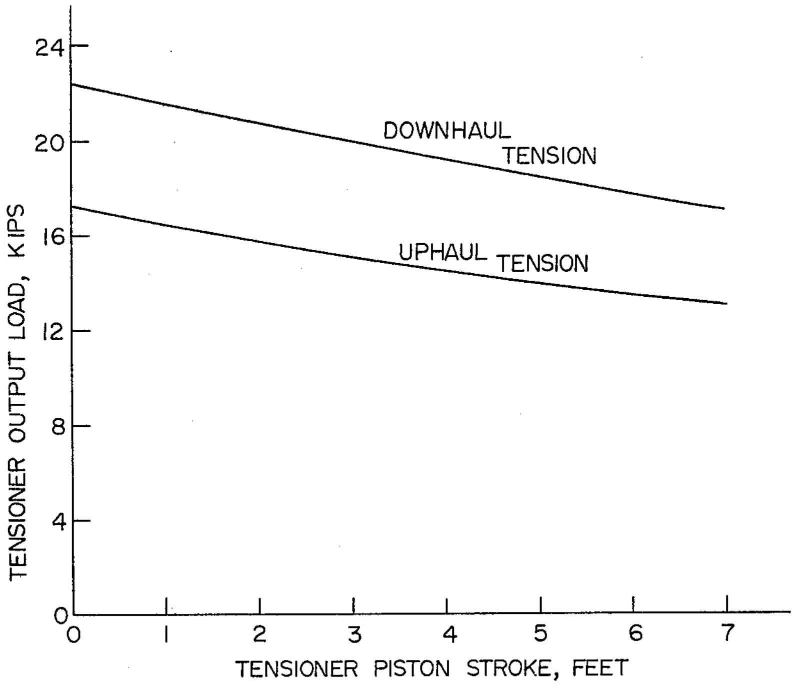
FIG. 16 is a graph illustrating the tension force exerted by the intermediate uphaul cable on the carrier.

To describe the operational characteristics of the present invention, in the preferred embodiment shown herein, the carrier 24 has an empty weight of about six thousand pounds and is designed to carry approximately thirty passengers, so that the passenger load would be perhaps six thousand pounds or somewhat less. Thus, the capsule fully loaded could be twelve thousand pounds. The actuating mechanism 74 is designed so that the intermediate uphaul line 64 has a tension thereon sufficiently greater than the loaded weight of the carrier capsule 24 so that it can raise the carrier capsule 24 at an adequately rapid rate. This is illustrated in FIG. 16, where the tension of the cable 64 is plotted against the position of the pistons. In that graph, it is assumed that the two pistons 86 have a seven foot stroke from the fully retraced to the fully extended position, and the sheave efficiency is about 0.87.

It can be seen that on the downhaul stroke, since the line 64 is feeling the effect of both the force of the pistons and the drag of the sheave assembly 83, the tension is higher. Also, when the two pistons 86 are fully extended the pressurized air that supplies power to the pistons is expanded so that the pressure is moderately reduced. Thus the tension is less when the two pistons 86 are extended. On the uphaul stroke, the two pistons 86 are being extended, and the friction of the sheave assembly 83 is working against the two pistons 86. Thus the tension is somewhat lower. However, at all times the tension on the line 64 is sufficiently high to lift the carrier capsule 24 when it is fully loaded.

Figures 14A, 14B, 14C, 14D, 14E, 14F, 15A, 15B, 15C, 15D, 15F:
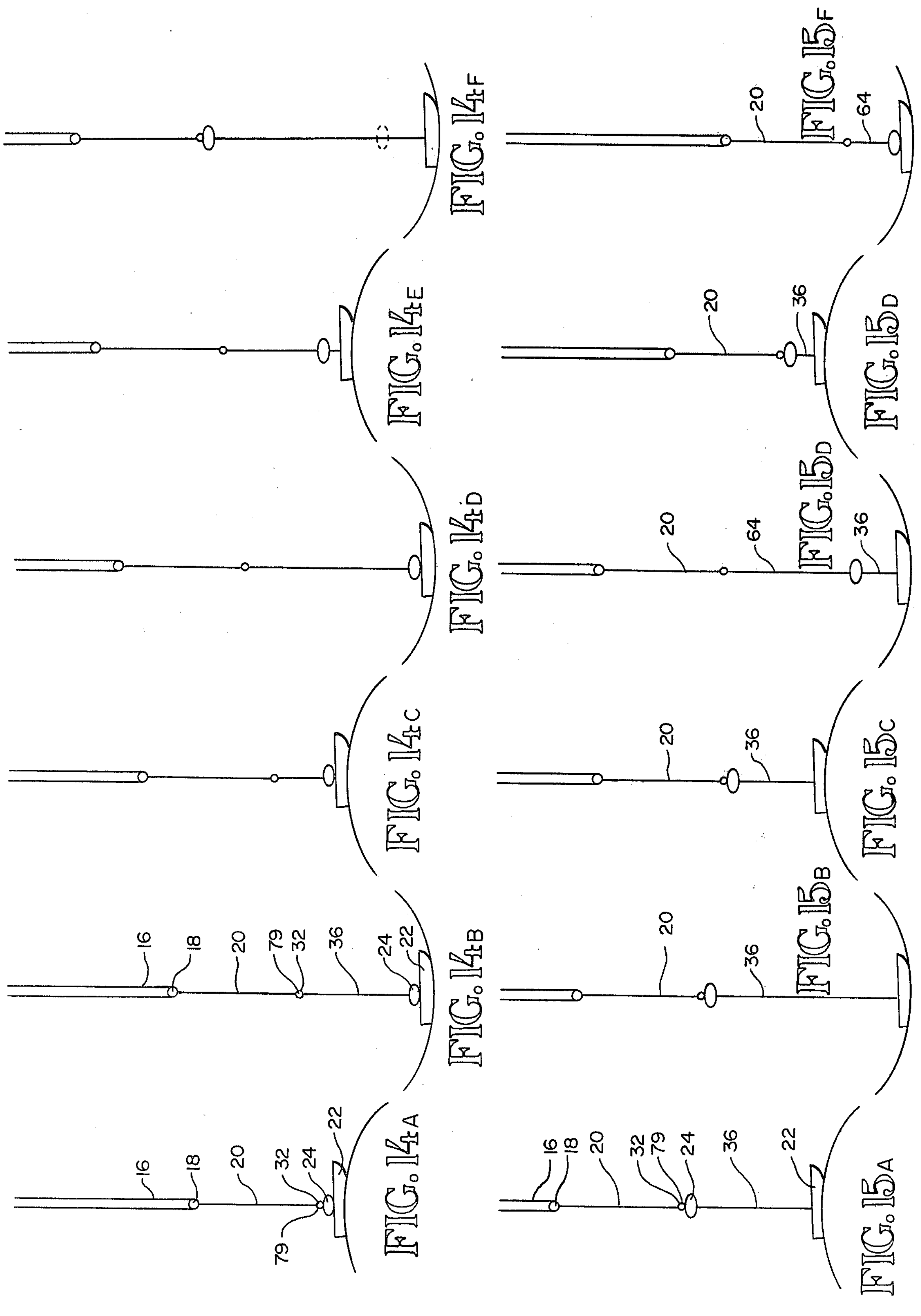
FIG. 14 is a series of side elevational views showing the sequence of lifting the carrier off the deck of the vessel, designated 14*a*-14*f*.
FIG. 15 is a second series of sequential views illustrating the manner in which the carrier is lowered to the deck of the vessel, designated 15*a*-15*f*.

To describe the operation of the present invention, reference is first made to FIG. 14 which shows a sequence of six figures, 14*a* thru 14*f*, showing the sequence of operation when the carrier capsule 24 is being lifted off the vessel 22. It is to be understood that in each of FIGS. 14*a* thru 14*f* the vessel 22 is at the same location relative to the platform 10, and is rising and falling with the waves.

The system of the present invention is designed to be able to transfer passengers or cargo where the average waves are as high as 3 meters, with maximum waves being as high as 10 meters. For these conditions, the intermediate uphaul line 64 should be able to be extended at least 12 meters and desirably as high as 13 meters.

Let it be assumed that the vessel 22 has travelled to a location beneath the boom 14, that the main block 18 has been lowered and that the hook 32 at the end of the pendant line 20 has been secured to the eye 79 that is attached to the upper end of the intermediate uphaul line 64, as in FIG. 2.

In the situation shown in FIG. 2, the downhaul winch 58 is held stationary so that the downhaul line 36 holds the carrier capsule 24 securely on the landing pad 26. In FIG. 14*a*, the main uphaul cable 16 has been lifted so that the pendant line 20 is nearly taut, with the vessel 22 being on the crest of the wave. The main cable 16 continues to be raised at a steady rate, and it can be seen in FIG. 14*b* that the vessel 22 is at the trough of a wave and the intermediate uphaul line 64 has been extended from the carrier capsule 24. In FIG. 14*c*, the main uphaul cable 16 has been raised further, and with the carrier capsule 24 still secured to the vessel 22, the intermediate uphaul line 64 remains extended to a moderate extent.

With the situation as shown in FIG. 14*c*, the operator for the downhaul winch 58 (the operator being indicated at 180 in FIG. 5) observes the height of the oncoming waves to select an appropriate time for "liftoff". The main uphaul cable 16 continues to be raised until the intermediate uphaul line 64 is extended to half of its extension length when the vessel 22 is half way between the crests and troughs of the waves. (For example, if the waves are five meters in height, and if the intermediate uphaul line 64 has a total length of 13 meters, then the intermediate uphaul line will be extended four meters when the vessel 22 is on the crest of a wave and be extended nine meters when the vessel is at the trough of a wave.

As the vessel 22 is rising on a wave, shortly before the vessel reaches the crest of the wave, the operator 180 begins to pay out the downhaul line in the controlled velocity uphaul mode (indicated as the second operating mode previously herein). Thus, as the carrier capsule 24 is a moderate distance above the deck 28, it will move at a controlled rate (generally a constant rate) away from the vessel 22, but will have an "up and down" velocity component relative to the platform 10 so as to match the up and down motion of the vessel 22. Thus, in FIG. 14*e*, the carrier capsule 24 is shown just rising from the deck 28. In FIG. 14*f*, the capsule carrier is shown in broken lines having moved a moderate distance further away from the deck 28, but downwardly relative to the platform 10. At the same time, the actuating mechanism 74 continues to reel in or pay out the intermediate uphaul cable 64 to raise and lower the carrier capsule 24 to match the motion of the vessel 22.

When the downhaul line 35 has been payed out to the extent that when the vessel 22 is on the crest of the wave, the carrier capsule 24 is relatively close to the hook 32 of the pendant line 20, then the carrier capsule 24 should be sufficiently far from the vessel 22 so that it is possible to shift the winch from its second mode to its third low tension mode. As described previously herein, in the low tension mode the winch 58 exerts only enough tension on the downhaul line 36 to keep the lines 36 taut, and this tension is not large enough to pull the carrier capsule 24 downwardly against the upward pull of the intermediate uphaul line 64. As soon as the winch 58 is placed in its third low tension mode, the intermediate uphaul line 64 is reeled in by the actuating mechanism 74 so that the capsule moves up against the hook 32 of the pendant line 20. As described previously herein, the action of the rate control orifice 130 and the snubber orifice 146 insures that the upward velocity of the capsule 24 is not excessive and also that the velocity is reduced when the last several feet of the line 64 is being reeled in.

Then the crane 12 lifts the capsule 24 above the platform 10 and sets the capsule 24 down. Throughout the lifting of the capsule to the platform 10 and also through removal of the capsule from the platform 10, the downhaul line 36 remains attached to the carrier capsule 24, with the winch 58 applying moderate tension to the line 36.

In FIG. 15, there are six sequential figures, similar to FIG. 14, illustrating the manner in which the capsule 24 is landed onto the vessel 22. Let is be assumed that the crane 12 has lifted the capsule 24 from the platform 10 and has lowered it to the position shown in FIG. 15*a*. As the vessel 22 rises and falls with the waves, the winch is in its third low tension mode, and the downhaul cable 36 reels in and pays out so that this line 36 remains reasonably taut. When the carrier capsule 24 has been lowered fairly close to the vessel 22, as seen in FIG. 15*c*, the operator 180 makes a decision as to when he will move the winch 58 into its first operating mode, which is the controlled velocity downhaul mode described previously herein. Let it be assumed that the vessel 22 has reached a crest of a wave, as in FIG. 15*c*, and the operator 180 then switches over to begin pulling the carrier capsule 24 down to the vessel 22 by placing the winch 58 in its first operating mode.

When the vessel goes downwardly into a trough, the carrier capsule 24 follows the vessel 22 downwardly and the intermediate upahul line 64 becomes extended. It is to be understood that at the same time the main uphaul cable 16 is continuously moving downwardly. In FIG. 15*e*, the capsule 24 is still moving up and down with the up and down movement of the vessel 22, but is being drawn closer to the vessel 22 by the downhaul line 36. FIG. 14*f* shows the capsule 24 brought down securely to the deck 28. The main uphaul cable 16 continues to be lowered until there is sufficient slack in the pendant line 50 so that the hook 32 of the pendant line 20 can be disengaged from the eye 79 of the intermediate uphaul line 64.

Figure 11:
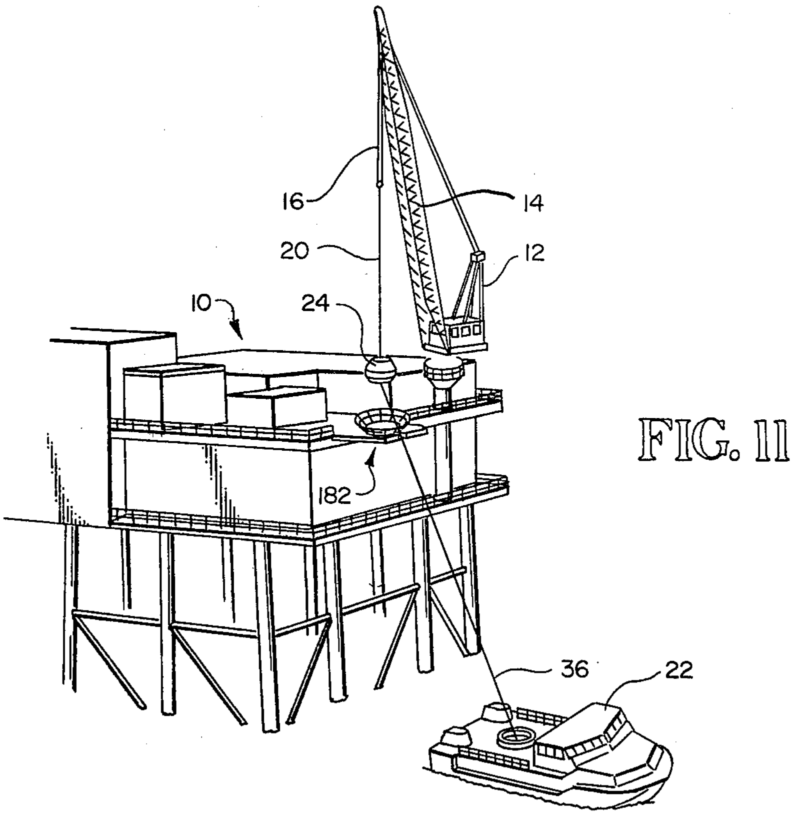
FIG. 11 is an isometric view showing the carrier being landed on a docking station of the present invention.
Figure 12:
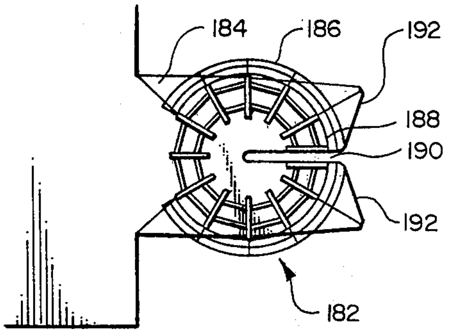
FIG. 12 is a top plan view of the docking station of FIG. 11.
Figure 13:
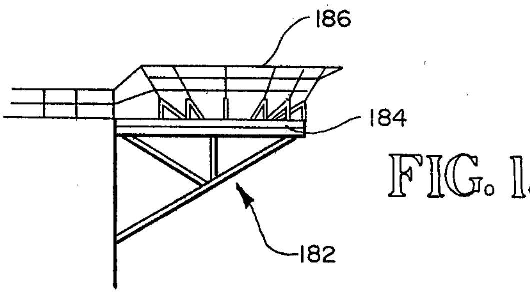
FIG. 13 is a side elevational view of the docking station of FIG. 11.

In FIGS. 11, 12 and 13, there is shown a docking station 182 particularly adapted for use in the present invention. This docking station 182 comprises a platform extension 184 extending laterally outwardly from the main platform 10. Mounted to the top surface of the platform extension 184 is a generally circular receiving structure 186. This receiving structure 186 has a circumferential frame 188 that slopes downwardly and radially inwardly to match the sloping lower peripheral portion 42 of the carrier housing 38. The platform extension 184 and the receiving structure 186 are formed with an outwardly facing, laterally extending, open slot 190 that extends through both the platform extension 184 and the receiving structure 186. This slot 190 extends from the center of the receiving structure 186 to the outer edge thereof.

When the carrier capsule 24 is moved by the boom 10 above the receiving structure 186, the downhaul line 36 can slip into the slot 190 as the capsule 24 is lowered into place. The outer edges of the platform extension 184 are tapered slightly, as at 192, to guide the line 36 into place.

When the carrier capsule 24 has "landed" on the docking station 184, the line 36 extends downwardly so that if there is any sudden downward pull on the line 36, this would not tend to dislodge the capsule 24 from the docking station 182. However, when the carrier capsule 24 is lifted and moved outwardly from the docking station 182, the through slot 190 presents no obstruction to the line 36, so that it can move free of the docking station.

It is to be understood that various modifications could be made to the system of the present invention without departing from the inventive concepts described herein. For example, in the actuating mechanism, two cylinder and piston units 84–86 and six sheaves 92–94 are shown, but obviously these numbers could be varied. Further, other features, such as safety features, could be added. For example, in FIG. 8, there is indicated schematically at 192 a device to sever the intermediate downhaul line 64. This could be used, for example, to disengage the capsule 24 from the crane 12 in the event of some emergency. Other refinements will undoubtedly be added by those skilled in the art.

We claim:

1. A docking station adapted to be used in conjunction with a vessel adapted to float on water, a carrier adapted to be positioned at a landing location on the carrier, a downhaul line operatively connected from said vessel to said carrier, and uphaul means to lift said carrier to said station, said docking station comprising:

a. a docking structure having an upwardly facing receiving surface to engage said carrier as said carrier is lifted by uphaul means and placed on said docking structure, b. said docking structure having a laterally open through slot to receive said downhaul line extending downwardly from said carrier to said vessel.

2. The docking station as recited in claim 1, wherein said docking station has two outwardly facing surface portions adjacent an entry portion of said slot, whereby as said downhaul line approaches said surface portions, said downhaul line is guided into said slot.

3. A transfer system comprising:

a. a first platform;

b. a second platform movable relative to said first platform;

c. first uphaul means operatively connected to said first platform;

d. a carrier adapted to be moved between said first and second platforms, said carrier comprising a carrier housing and extendable and retractable intermediate uphaul means adapted to be connected between said carrier housing and the first uphaul means, said intermediate uphaul means including actuating means to raise and lower said carrier housing relative to the first uphaul means by retracting and extending said intermediate uphaul means;

e. downhaul means operatively connected between the carrier and the second platform and adapted to pull said carrier to said second platform;

f. said actuating means being characterized in that it exerts a tension force through said intermediate uphaul means greater than weight of the carrier;

g. said downhaul means being characterized in that it has a downhaul operating mode where it exerts on said carrier a downhaul force greater than a value which is equal to the tension force less the weight of the carrier;

h. said actuating means comprising a resilient actuating mechanism comprising an actuating member which is yieldingly urged toward movement in a direction to retract said intermediate uphaul means and yieldingly resist movement in a direction to extend said intermediate uphaul means;

i. said actuating mechanism comprising velocity control means to limit velocity of the actuating member in a direction to retract said intermediate uphaul means.

4. The system as recited in claim 3, wherein said velocity control means is arranged to have a higher velocity limiting mode and a lower velocity limiting mode, with said higher velocity limiting mode being operative during a first portion of travel of the actuating member to retract the intermediate uphaul means, and the second lower limiting mode being operative during a second portion of travel of the actuating member completing retraction of the intermediate uphaul means.

5. The system as recited in claim 4, wherein said velocity control means comprises hydraulic means having orifice means having a higher flow rate for the first portion of travel of the actuating member, and a lower flow rate for the second portion of travel of the actuating member.

6. The system as recited in claim 5, wherein said velocity control means comprises high flow hydraulic return means which permits hydraulic flow in a reverse direction to permit movement of said actuating member at a higher rate in a direction to extend said intermediate uphaul means.

7. The system as recited in claim 3, wherein said velocity control means comprises a hydraulic system having a first higher flow rate orifice and a second lower flow rate orifice, said hydraulic system being arranged so that during a first portion of travel of said actuating member to retract said intermediate uphaul means, movement of said actuating member moves hydraulic fluid through said first orifice to enable said actuating member to move at a higher velocity, and during a second portion of travel of said actuating member to retract the intermediate uphaul means further to a fully retracted position, said second orifice means limits hydraulic flow to cause said actuating member to move at a lower velocity.

8. The system as recited in claim 7, wherein said actuating member is operatively connected to a chamber containing the hydraulic fluid, and movement of said actuating member to retract said intermediate uphaul means reduces volume of said chamber to move the hydraulic fluid therefrom, said velocity control means being arranged to cause flow of hydraulic fluid through said first orifice means to bypass said second orifice means for the first portion of travel of the actuating member and to move at least a portion of said hydraulic fluid directly through said second orifice means during said second portion of travel to cause the reduced velocity of the actuating member.

9. A transfer system comprising:

a. a first platform;

b. a second platform movable relative to said first platform;

c. first uphaul means operatively connected to said first platform;

d. a carrier adapted to be moved between said first and second platforms, said carrier comprising a carrier housing and extendable and retractable intermediate uphaul means adapted to be connected between said carrier housing and the first uphaul means, said intermediate uphaul means including actuating means to raise and lower said carrier housing relative to the first uphaul means by retracting and extending said intermediate uphaul means;

e. downhaul means operatively connected between the carrier and the second platform and adapted to pull said carrier to said second platform;

f. said actuating means comprising a cylinder and piston assembly which comprises piston means and cylinder means, and said intermediate uphaul means comprises an intermediate uphaul line operatively connected to said cylinder and piston assembly in a manner that extension of said cylinder and piston assembly retracts said intermediate uphaul line and retraction of said cylinder and piston assembly permits extension of said intermediate uphaul line;

g. said cylinder and piston assembly is characterized in that it is actuated by a compressible gas so as to be yieldingly urged toward movement in a direction to retract said intermediate uphaul line and yieldingly resist movement in a direction to extend said intermediate uphaul line;

h. said actuating mechanism comprising velocity control means to limit velocity of the cylinder and piston assembly in a direction to retract said intermediate uphaul line.

10. The system as recited in claim 9, wherein said velocity control means is arranged to have a higher velocity limiting mode and a lower velocity limiting mode, with said higher velocity limiting mode being operative during a first portion of travel of the cylinder and piston assembly to retract the intermediate uphaul line, and the second lower limiting mode being operative during a second portion of travel of the cylinder and piston assembly completing retraction of the intermediate uphaul line.

11. The system as recited in claim 10, wherein said velocity control means comprises hydraulic means having orifice means having a higher flow rate for the first portion of travel of the cylinder and piston assembly, and a lower flow rate for the second portion of travel of the cylinder and piston assembly.

12. The system as recited in claim 11, wherein said velocity control means comprises high flow hydraulic return means which permits hydraulic flow in a reverse direction to permit movement of said cylinder and piston assembly at a higher rate in a direction to extend said intermediate uphaul line.

13. The system as recited in claim 9, wherein said velocity control means comprises a hydraulic system having a first higher flow rate orifice and a second lower flow rate orifice, said hydraulic system being arranged so that during a first portion of travel of said cylinder and piston assembly to retract said intermediate uphaul line, movement of said cylinder and piston assembly moves hydraulic fluid through said first orifice to enable said cylinder and piston assembly to move at a higher velocity, and during a second portion of travel of said cylinder and piston assembly to retract the intermediate uphaul line further to a fully retracted position, said second orifice means limits hydraulic flow to cause said cylinder and piston assembly to move at a lower velocity.

14. The system as recited in claim 13, wherein said cylinder and piston assembly is operatively connected to a chamber containing the hydraulic fluid, and movement of said cylinder and piston assembly to retract said intermediate uphaul line reduces volume of said chamber to move the hydraulic fluid therefrom, said velocity control means being arranged to cause flow of the hydraulic fluid through said first orifice means to bypass said second orifice means for the first portion of travel of the cylinder and piston assembly, and to move at least a portion of said hydraulic fluid directly through said second orifice means during said second portion of travel to cause the reduced velocity of the cylinder and piston assembly.

15. A transfer system comprising:

a. a first platform;

b. a second platform movable relative to said first platform;

c. first uphaul means operatively connected to said first platform;

d. a carrier adapted to be moved between said first and second platforms, said carrier comprising a carrier housing and extendable and retractable intermediate uphaul means adapted to be connected between said carrier housing and the first uphaul means, said intermediate uphaul means including actuating means to raise and lower said carrier housing relative to the first uphaul means by retracting and extending said intermediate uphaul means;

e. downhaul means operatively connected between the carrier and the second platform and adapted to pull said carrier to said second platform;

f. said downhaul means comprising a downhaul cable which is retracted to move said carrier to said second platform and extended for movement of said carrier away from said second platform, said downhaul means being characterized in having three operating modes, namely:

1. a velocity controlled retracting mode where said downhaul cable is retracted at a controlled velocity;
2. a velocity controlled extending mode where said downhaul cable is extended at a controlled velocity;
3. a low tension mode where said downhaul cable is extended or retracted selectively to alleviate slack in said cable means where there is oscillating movement between said carrier and said second platform.

16. The system as recited in claim 15, wherein said downhaul means comprises a hydraulic power system comprising a hydraulic pump and a hydraulic motor, said hydraulic power system being characterized in that:

a. in the retracting mode said pump drives said motor to retract said downhaul cable;

b. in said velocity controlled extending mode said hydraulic motor is driven by tension on said downhaul cable to move hydraulic fluid from said motor, with said pump being controlled to limit flow of the hydraulic fluid to the motor;

c. in said low tension mode, said pump delivers hydraulic fluid in a direction to retract said downhaul cable at a relatively low pressure so that said motor is able to move in a direction opposite to a direction in which the pump tends to drive the motor.

17. The system as recited in claim 16, wherein said hydraulic power system comprises low pressure bypass means which can be selectively brought into operation to cause said downhaul means to operate in its low tension mode.

18. The system as recited in claim 15, wherein said downhaul means comprises a hydraulic system which in turn comprises:

a. a motor which operates to retract or extend said downhaul cable;

b. a reversible variable capacity pump operatively connected to said motor to power said motor in first and second directions at a controlled variable speed;

c. low pressure bypass means operatively connected to said pump to cause fluid from said pump to bypass said motor.

19. The system as recited in claim 18, comprising flow control means operatively connected between said motor and said pump to control fluid flow from said motor to said pump when said downhaul means is operating in said velocity controlled extending mode, so that said flow control means can be selectively operated to control rate at which said cable is extended.

20. The system as recited in claim 19, wherein said flow control means is responsive to pressure of fluid delivered by said pump to said motor, in a manner that when said motor overruns said pump to cause a reduction in pressure of fluid delivered from said pump to said motor, said flow control means limits flow from said motor to said pump to control speed of said motor.

21. A transfer system adapted to effect transfer to and from a platform which is at a water location and has an uphaul mechanism to effect transfer to and from said platform, said system being adapted to operate in wave conditions where waves are within a predetermined maximum wave height, said system comprising:

a. a vessel adapted to float on water;

b. a carrier adapted to be positioned at a landing location on said vessel, said carrier comprising a carrier housing and extendable and retractable intermediate uphaul means adapted to be connected between said carrier housing and the uphaul mechanism, said intermediate uphaul means including actuating means to raise and lower said carrier housing relative to the uphaul mechanism by retracting and extending said intermediate uphaul means;

c. downhaul means mounted to said vessel and operatively connected between the carrier and the vessel and adapted to pull said carrier to said landing location;

d. said intermediate uphaul means having a fully retracted position and a fully extended position spaced from said fully retracted position by an extension distance greater than said maximum wave height;

e. said intermediate uphaul means comprising an intermediate uphaul line having an upper end that is adapted to be attached to the uphaul mechanism, with said line being capable of being extended to said extension distance;

f. said actuating means being characterized in that it exerts a tension force through said intermediate uphaul line greater than weight of the carrier;

g. said downhaul means being characterized in that it has a downhaul operating mode where it exerts on said carrier a downhaul force greater than a value which is equal to the tension force less the weight of the carrier;

h. said actuating means comprising a resilient actuating mechanism comprising an actuating member which is yieldingly urged toward movement in a direction to retract said intermediate uphaul line and yieldingly resist movement in a direction to extend said intermediate uphaul line;

i. said actuating mechanism comprising velocity control means to limit velocity of the actuating member in a direction to retract said intermediate uphaul line.

22. The system as recited in claim 21, wherein said velocity control means is arranged to have a higher velocity limiting mode and a lower velocity limiting mode, with said higher velocity limiting mode being operative during a first portion of travel of the actuating member to retract the intermediate uphaul line, and the second lower limiting mode being operative during a second portion of travel of the actuating member completing retraction of the intermediate uphaul line.

23. The system as recited in claim 22, wherein said velocity control means comprises hydraulic means having orifice means having a higher flow rate for the first portion of travel of the actuating member, and a lower flow rate for the second portion of travel of the actuating member.

24. The system as recited in claim 23, wherein said velocity control means comprises high flow hydraulic return means which permits hydraulic flow in a reverse direction to permit movement of said actuating member at a higher rate in a direction to extend said intermediate uphaul line.

25. The system as recited in claim 21, wherein said velocity control means comprises a hydraulic system having a first higher flow rate orifice and a second lower flow rate orifice, said hydraulic system being arranged so that during a first portion of travel of said actuating member to retract said intermediate uphaul line, movement of said actuating member moves hydraulic fluid through said first orifice to enable said actuating member to move at a higher velocity, and during a second portion of travel of said actuating member to retract the intermediate uphaul means further to a fully retracted position, said second orifice means limits hydraulic flow to cause said actuating member to move at a lower velocity.

26. The system as recited in claim 25, wherein said actuating member is operatively connected to a chamber containing the hydraulic fluid, and movement of said actuating member to retract said intermediate uphaul line reduces volume of said chamber to move the hydraulic fluid therefrom, said velocity control means being arranged to cause flow of hydraulic fluid through said first orifice means to bypass said second orifice means for the first portion of travel of the actuating member and to move at least a portion of said hydraulic fluid directly through said second orifice means during said second portion of travel to cause the reduced velocity of the actuating member.

27. A transfer system adapted to effect transfer to and from a platform which is at a water location and has an uphaul mechanism to effect transfer to and from said platform, said system being adapted to operate in wave conditions where waves are within a predetermined maximum wave height, said system comprising:

a. a vessel adapted to float on water;

b. a carrier adapted to be positioned at a landing location on said vessel, said carrier comprising a carrier housing and extendable and retractable intermediate uphaul means adapted to be connected between said carrier housing and the uphaul mechanism, said intermediate uphaul means including actuating means to raise and lower said carrier housing relative to the uphaul mechanism by retracting and extending said intermediate uphaul means;

c. downhaul means mounted to said vessel and operatively connected between the carrier and the vessel and adapted to pull said carrier to said landing location;

d. said actuating means comprising a cylinder and piston assembly which comprises piston means and cylinder means, and said intermediate uphaul means comprises an intermediate uphaul line operatively connected to said cylinder and piston assembly in a manner that extension of said cylinder and piston assembly retracts said intermediate uphaul line and retraction of said cylinder and piston assembly permits extension of said intermediate uphaul line;

e. said cylinder and piston assembly is characterized in that it is actuated by a compressible gas so as to be yieldingly urged toward movement in a direction to retract said intermediate uphaul line and yieldingly resist movement in a direction to extend said intermediate uphaul line;

f. said actuating mechanism comprising velocity control means to limit velocity of the cylinder and piston assembly in a direction to retract said intermediate uphaul line.

28. The system as recited in claim 27, wherein said velocity control means is arranged to have a higher velocity limiting mode and a lower velocity limiting mode, with said higher velocity limiting mode being operative during a first portion of travel of the cylinder and piston assembly to retract the intermediate uphaul line, and the second lower limiting mode being operative during a second portion of travel of the cylinder and piston assembly completing retraction of the intermediate uphaul line.

29. The system as recited in claim 28, wherein said velocity control means comprises hydraulic means having orifice means having a higher flow rate for the first portion of travel of the cylinder and piston assembly, and a lower flow rate for the second portion of travel of the cylinder and piston assembly.

30. The system as recited in claim 29, wherein said velocity control means comprises high flow hydraulic return means which permits hydraulic flow in a reverse direction to permit movement of said cylinder and piston assembly at a higher rate in a direction to extend said intermediate uphaul line.

31. The system as recited in claim 27, wherein said velocity control means comprises a hydraulic system having a first higher flow rate orifice and a second lower flow rate orifice, said hydraulic system being arranged so that during a first portion of travel of said cylinder and piston assembly to retract said intermediate uphaul line, movement of said cylinder and piston assembly moves hydraulic fluid through said first orifice to enable said cylinder and piston assembly to move at a higher velocity, and during a second portion of travel of said cylinder and piston assembly to retract the intermediate uphaul line further to a fully retracted position, said second orifice means limits hydraulic flow to cause said cylinder and piston assembly to move at a lower velocity.

32. The system as recited in claim 31, wherein said cylinder and piston assembly is operatively connected to a chamber containing the hydraulic fluid, and movement of said cylinder and piston assembly to retract said intermediate uphaul line reduces volume of said chamber to move the hydraulic fluid therefrom, said velocity control means being arranged to cause flow of the hydraulic fluid through said first orifice means to bypass said second orifice means for the first portion of travel of the cylinder and piston assembly, and to move at least a portion of said hydraulic fluid directly through said second orifice means during said second portion of travel to cause the reduced velocity of the cylinder and piston assembly.

33. A transfer system adapted to effect transfer to and from a platform which is at a water location and has an uphaul mechanism to effect transfer to and from said platform, said system being adapted to operate in wave conditions where waves are within a predetermined maximum wave height, said system comprising:

a. a vessel adapted to float on water;

b. a carrier adapted to be positioned at a landing location on said vessel, said carrier comprising a carrier housing and extendable and retractable intermediate uphaul means adapted to be connected between said carrier housing and the uphaul mechanism, said intermediate uphaul means including actuating means to raise and lower said carrier housing relative to the uphaul mechanism by retracting and extending said intermediate uphaul means;

c. downhaul means mounted to said vessel and operatively connected between the carrier and the vessel and adapted to pull said carrier to said landing location;

d. said actuating means comprising a cylinder and piston assembly which comprises piston means and cylinder means, and said intermediate uphaul means comprises an intermediate uphaul line operatively connected to said cylinder and piston assembly in a manner that extension of said cylinder and piston assembly retracts said intermediate uphaul line and retraction of said cylinder and piston assembly permits extension of said intermediate uphaul line;

e. said actuating means further comprising a sheave assembly comprising first sheave means connected to said piston means and second sheave means connected to said cylinder means, said intermediate uphaul line being connected between said first and second sheave means;

f. said carrier housing having a carrying area to receive objects to be carried, said cylinder and piston assembly and said sheave means being mounted in said carrier housing below said carrying area, said uphaul line extending from said sheave means upwardly through said carrying area and through an upper portion of said carrier housing.

34. A transfer system adapted to effect transfer to and from a platform which is at a water location and has an uphaul mechanism to effect transfer to and from said platform, said system being adapted to operate in wave conditions where waves are within a predetermined maximum wave height, said system comprising:

a. a vessel adapted to float on water;

b. a carrier adapted to be positioned at a landing location on said vessel, said carrier comprising a carrier housing and extendable and retractable intermediate uphaul means adapted to be connected between said carrier housing and the uphaul mechanism, said intermediate uphaul means including actuating means to raise and lower said carrier housing relative to the uphaul mechanism by retracting and extending said intermediate uphaul means;

c. downhaul means mounted to said vessel and operatively connected between the carrier and the vessel and adapted to pull said carrier to said landing location;

d. said intermediate uphaul means having a fully retracted position and a fully extended position spaced from said fully retracted position by an extension distance greater than said maximum wave height;

e. said downhaul means comprising a downhaul cable which is retracted to move said carrier to said vessel and extended for movement of said carrier away from said vessel, said downhaul means being characterized in having three operating modes, namely:

1. a velocity controlled retracting mode where said downhaul cable is retracted at a controlled velocity;
2. a velocity controlled extending mode where said downhaul cable is extended at a controlled velocity;
3. a low tension mode where said downhaul cable is extended or retracted selectively to alleviate slack in said cable means where there is oscillating movement between said carrier and said second platform.

35. The system as recited in claim 34, wherein said downhaul means comprises a hydraulic power system comprising a hydraulic pump and a hydraulic motor, said hydraulic power system being characterized in that:

a. in the retracting mode said pump drives said motor to retract said downhaul cable;

b. in said velocity controlled extending mode said hydraulic motor is driven by tension on said downhaul cable to move hydraulic fluid from said motor, with said pump being controlled to limit flow of the hydraulic fluid to the motor;

c. in said low tension mode, said pump delivers hydraulic fluid in a direction to retract said downhaul cable at a relatively low pressure so that said motor is able to move in a direction opposite to a direction in which the pump tends to drive the motor.

36. The system as recited in claim 35, wherein said hydraulic power system comprises low pressure bypass means which can be selectively brought into operation to cause said downhaul means to operate in its low tension mode.

37. The system as recited in claim 34, wherein said downhaul means comprising a hydraulic system which in turn comprises:

a. a motor which operates to retract or extend said downhaul cable;
b. a reversible variable capacity pump operatively connected to said motor to power said motor in first and second directions at a controlled variable speed;
c. low pressure bypass means operatively connected to said pump to cause fluid from said pump to bypass said motor.

38. The system as recited in claim 37, comprising flow control means operatively connected between said motor and said pump to control fluid flow from said motor to said pump when said downhaul means is operating in said velocity controlled extending mode, so that said flow control means can be selectively operated to control rate at which said cable is extended.

39. The system as recited in claim 38, wherein said flow control means is responsive to pressure of fluid delivered by said pump to said motor, in a manner that when said motor overruns said pump to cause a reduction in pressure of fluid delivered from said pump to said motor, said flow control means limits flow from said motor to said pump to control speed of said motor.

40. A carrier adapted to effect transfer between a platform, which is at a water location and has an uphaul mechanism to effect transfer to and from the platform, and a vessel, which is adapted to float on water and has a downhaul mechanism to effect transfer downwardly to a landing location on said vessel, said carrier comprising:

a. a carrier housing having a carrying area adapted to contain transferable objects;
b. an intermediate uphaul line having one end connected to said carrier and a second end adapted to be connected to said uphaul mechanism;
c. a cylinder and piston assembly which comprises cylinder means and piston means mounted in said housing;
d. said intermediate uphaul line operatively connected to said cylinder and piston assembly in a manner that extension of said cylinder and piston assembly retracts said intermediate uphaul line and retraction of said cylinder and piston assembly permits extension of said intermediate uphaul line;
e. said cylinder and piston assembly being actuated by a compressible gas so as to be yieldingly urged toward movement in a direction to retract said intermediate uphaul line and yieldingly resist movement in a direction to extend said intermediate uphaul line;
f. said cylinder and piston assembly comprising velocity control means to limit velocity of the cylinder and piston assembly in a direction to retract said intermediate uphaul line.

41. The carrier as recited in claim 40, wherein said velocity control means is arranged to have a higher velocity limiting mode and a lower velocity limiting mode, with said higher velocity limiting mode being operative during a first portion of travel of the cylinder and piston assembly to retract the intermediate uphaul line, and the second lower limiting mode being operative during a second portion of travel of the cylinder and piston assembly completing retraction of the intermediate uphaul line.

42. The carrier as recited in claim 41, wherein said velocity control means comprises hydraulic means having orifice means having a higher flow rate for the first portion of travel of the cylinder and piston assembly, and a lower flow rate for the second portion of travel of the cylinder and piston assembly.

43. The carrier as recited in claim 42, wherein said velocity control means comprises high flow hydraulic return means which permits hydraulic flow in a reverse direction to permit movement of said cylinder and piston assembly at a higher rate in a direction to extend said intermediate uphaul line.

44. The carrier as recited in claim 40, wherein said velocity control means comprises a hydraulic system having a first higher flow rate orifice and a second lower flow rate orifice, said hydraulic system being arranged so that during a first portion of travel of said cylinder and piston assembly to retract said intermediate uphaul line, movement of said cylinder and piston assembly moves hydraulic fluid through said first orifice to enable said cylinder and piston assembly to move at a higher velocity, and during a second portion of travel of said cylinder and piston assembly to retract the intermediate uphaul line further to a fully retracted position, said second orifice means limits hydraulic flow to cause said cylinder and piston assembly to move at a lower velocity.

45. The carrier as recited in claim 44, wherein said cylinder and piston assembly is operatively connected to a chamber containing the hydraulic fluid, and movement of said cylinder and piston assembly to retract said intermediate uphaul line reduces volume of said chamber to move the hydraulic fluid therefrom, said velocity control means being arranged to cause flow of the hydraulic fluid through said first orifice means to bypass said second orifice means for the first portion of travel of the cylinder and piston assembly, and to move at least a portion of said hydraulic fluid directly through said second orifice means during said second portion of travel to cause the reduced velocity of the cylinder and piston assembly.

46. A carrier adapted to effect transfer between a platform, which is at a water location and has an uphaul mechanism to effect transfer to and from the platform, and a vessel, which is adapted to float on water and has a downhaul mechanism to effect transfer downwardly to a landing location on said vessel, said carrier comprising:

a. a carrier housing have a carrying area adapted to contain transferable objects;
b. an intermediate uphaul line having one end connected to said carrier and a second end adapted to be connected to said uphaul mechanism;
c. a cylinder and piston assembly which comprises cylinder means and piston means mounted in said housing;
d. said intermediate uphaul line operatively connected to said cylinder and piston assembly in a manner that extension of said cylinder and piston assembly retracts said intermediate uphaul line and retraction of said cylinder and piston assembly permits extension of said intermediate uphaul line;
e. a sheave assembly comprising first sheave means connected to said piston means and second sheave means connected to said cylinder means, said intermediate uphaul line being connected between said first and second sheave means;

f. said cylinder and piston assembly and said sheave means being mounted in said carrier housing below said carrying area, said uphaul line extending from said sheave means upwardly through said carrying area and through an upper portion of said carrier housing.

47. A method of transferring an object from a second platform to a first platform where said second platform moves relative to the first platform, and where said first platform has first uphaul means, said method comprising:

a. providing a carrier adapted to be moved between said second and first platforms, said carrier comprising a carrier housing and extendable and retractable intermediate uphaul means adapted to be connected between said carrier housing and the first uphaul means, said intermediate uphaul means including actuating means to raise and lower said carrier housing relative to the first uphaul means by retracting and extending said intermediate uphaul means;

b. providing downhaul means between said second platform and said carrier;

c. providing at said first platform a docking station comprising a receiving structure to receive said carrier housing, said receiving structure having a laterally open through slot to receive said downhaul means;

d. initially securing said carrier to said second platform;

e. attaching said first uphaul means to an upper end of said intermediate uphaul means;

f. raising said first uphaul means so as to extend said intermediate uphaul means a predetermined distance, while said carrier is secured to said second platform;

g. releasing said carrier from said second platform and causing said actuating means to retract said intermediate uphaul means to lift said carrier from said second platform toward said first uphaul means;

h. extending said downhaul means as said carrier is released from said second platform, while maintaining said downhaul means connected between said second platform and said carrier, in a manner that said downhaul means is initially extended at a controlled velocity so as to maintain a proper spacing distance relationship between said carrier and said second platform, with said intermediate uphaul means extending or retracting to compensate for relative motion between the first and second platforms, and said downhaul means is then operated at a low tension mode to permit said intermediate uphaul means to retract and move said carrier upwardly toward said first uphaul means, with said downhaul means maintaining moderate tension;

i. operating said first uphaul means to move said carrier onto said receiving structure while moving said downhaul means into said slot.

48. A method to effect transfer to and from a platform which is at a water location and has an uphaul mechanism to effect transfer to and from said platform, said system being adapted to operate in wave conditions where waves are within a predetermined maximum wave height, said method comprising:

a. providing a vessel adapted to float on water;

b. providing a carrier adapted to be positioned at a landing location on said vessel, said carrier comprising a carrier housing and extendable and retractable intermediate uphaul means adapted to be connected between said carrier housing and the uphaul mechanism, said intermediate uphaul means including actuating means to raise and lower said carrier housing relative to the uphaul mechanism by retracting and extending said intermediate uphaul means;

c. providing downhaul means mounted to said vessel and operatively connected between the carrier and the vessel and adapted to pull said carrier to said landing location;

d. providing said intermediate uphaul means as having a fully retracted position and a fully extended position spaced from said fully retracted position by an extension distance greater than said maximum wave height with said intermediate uphaul means comprising an intermediate uphaul line having an upper end that is adapted to be attached to the uphaul mechanism, with said line being capable of being extended to said extension distance, said actuating means exerting a tension force through said intermediate uphaul line greater than weight of the carrier, said downhaul means having an operating mode where it exerts on said carrier a downhaul force greater than a value which is equal to the tension force less the weight of the carrier;

e. initially securing said carrier to said vessel;

f. attaching said intermediate uphaul means to said uphaul mechanism;

g. raising said uphaul mechanism while the carrier is secured to the vessel, to a height such that said intermediate uphaul means is extended a distance greater than said maximum wave height when said vessel is at a bottom of a wave;

h. releasing said carrier from said vessel and causing said actuating means to retract said intermediate uphaul means to raise said carrier from said vessel in a manner that said downhaul means is extended at a controlled rate so as to maintain a proper spacing distance relationship between said carrier and said vessel, with the intermediate uphaul means extending or retracting to compensate for relative motion between the platform and the vessel, and said downhaul means is then operated in a low tension mode to permit said intermediate uphaul line to retract and lift said carrier above said maximum wave height;

i. operating said uphaul mechanism to move said carrier to said platform;

j. operating said uphaul mechanism to move said carrier from said platform to a location above said vessel and lowering said uphaul mechanism to move said carrier toward said vessel to a location above said maximum wave height, while said intermediate uphaul means remains retracted and said downhaul means is operating at its low tension mode;

k. then retracting said downhaul means at a controlled velocity so as to extend said intermediate uphaul line as the downhaul means moves the carrier to the first vessel, with said intermediate uphaul line extending or retracting to compensate for relative motion between the first and second platforms and the vessel.

49. The method as recited in claim 48, further comprising:

a. providing at said platform a docking station comprising a receiving structure to receive said carrier housing, said receiving structure having a laterally open through slot to receive said downhaul means;

b. moving said carrier onto said receiving structure while moving said downhaul line into said slot.

* * * * *